Dec. 2, 1941.    R. W. BUMSTEAD    2,264,563
SYSTEM FOR REMOTE CONTROL OF QUOTATION BOARDS
Filed Jan. 2, 1932    11 Sheets-Sheet 2
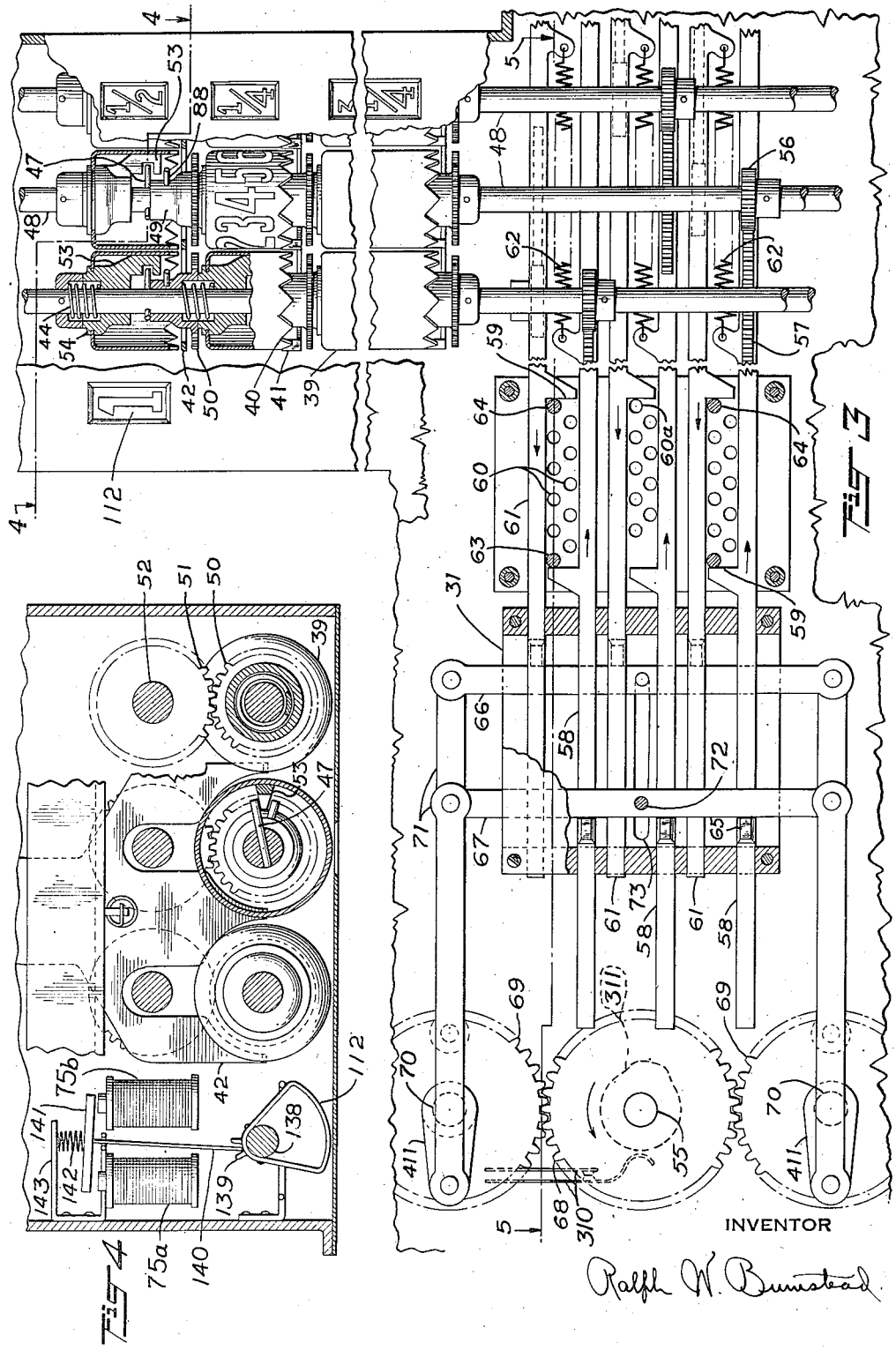
INVENTOR
Ralph W. Bumstead

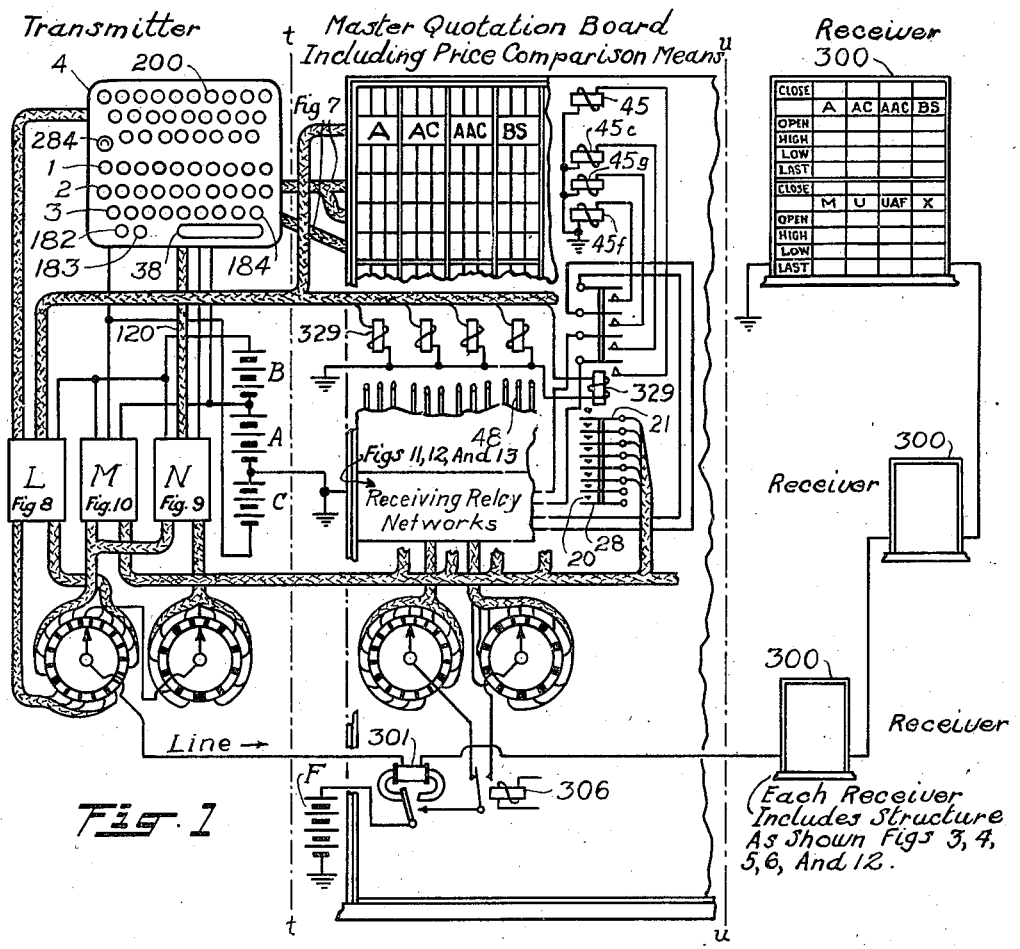

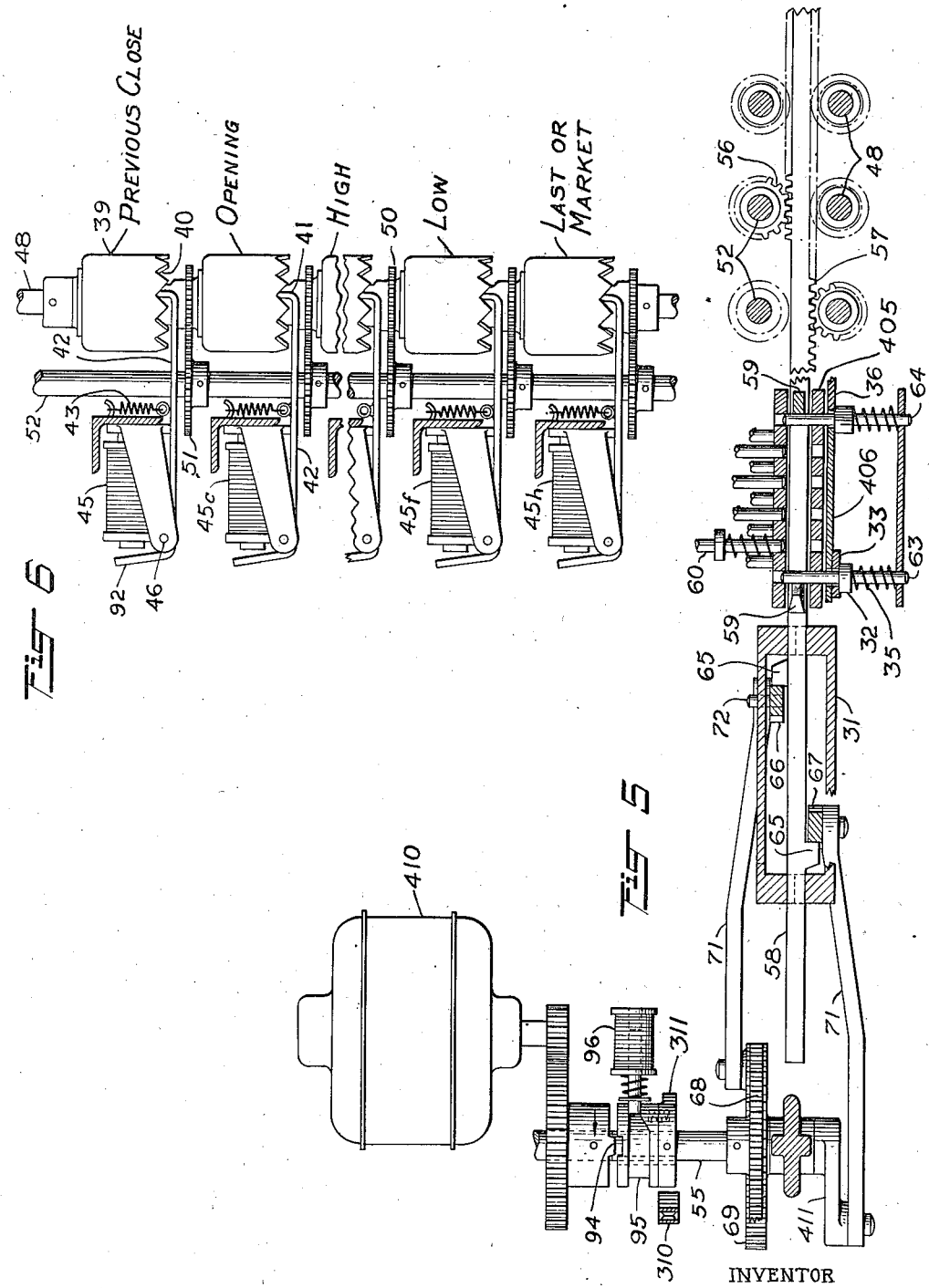

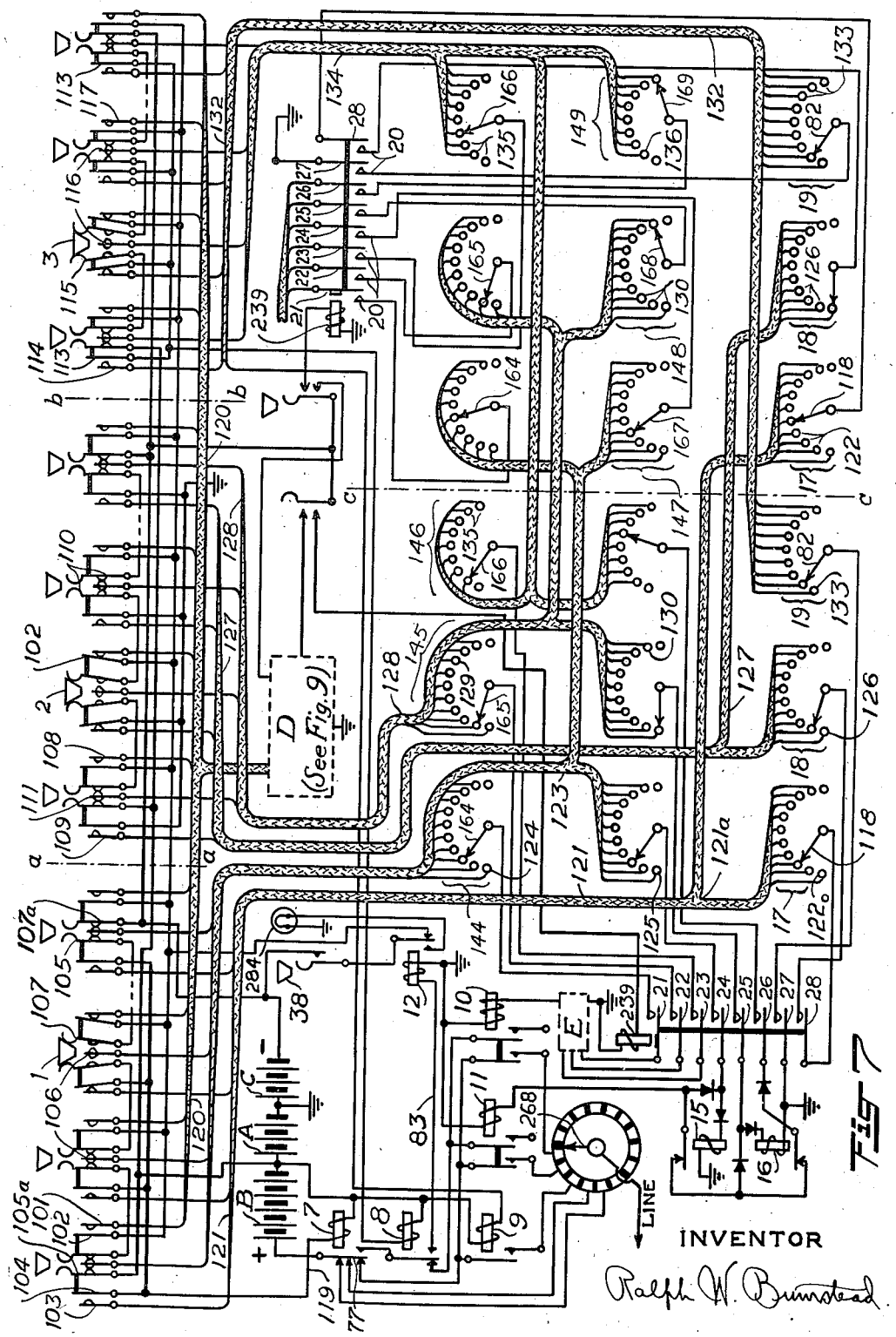

Dec. 2, 1941. R. W. BUMSTEAD 2,264,563
SYSTEM FOR REMOTE CONTROL OF QUOTATION BOARDS
Filed Jan. 2, 1932 11 Sheets-Sheet 5

INVENTOR
Ralph W. Bumstead

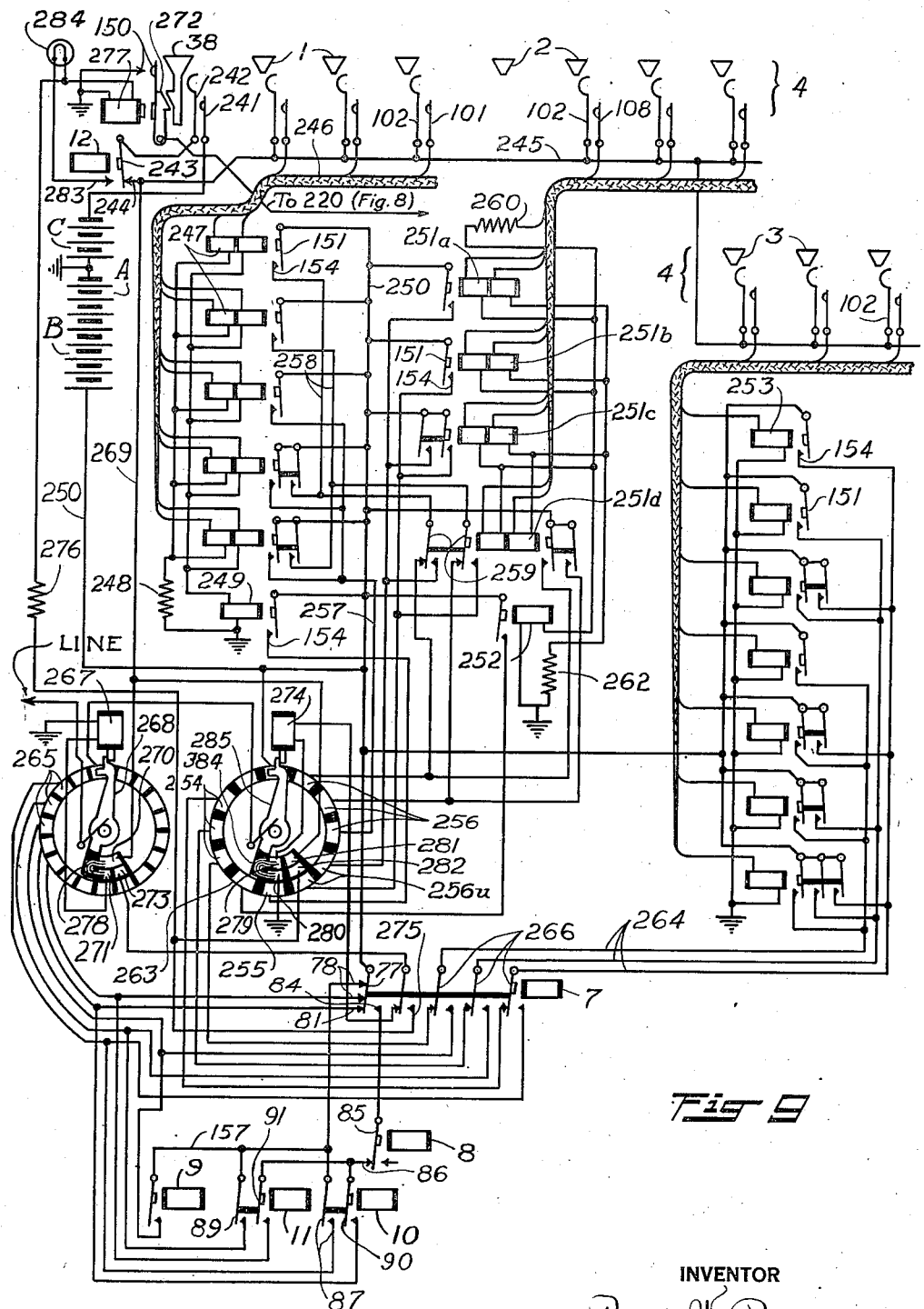

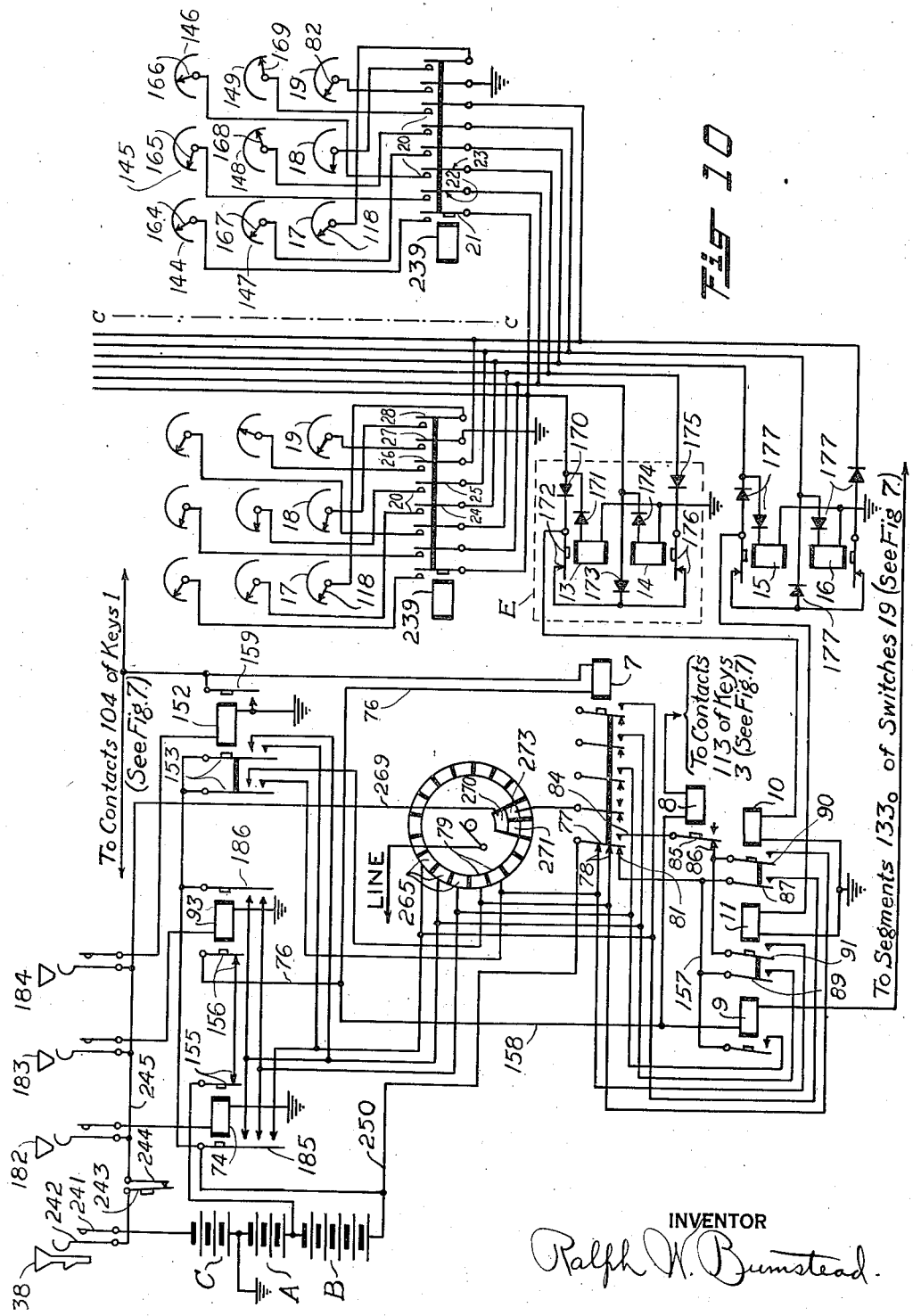

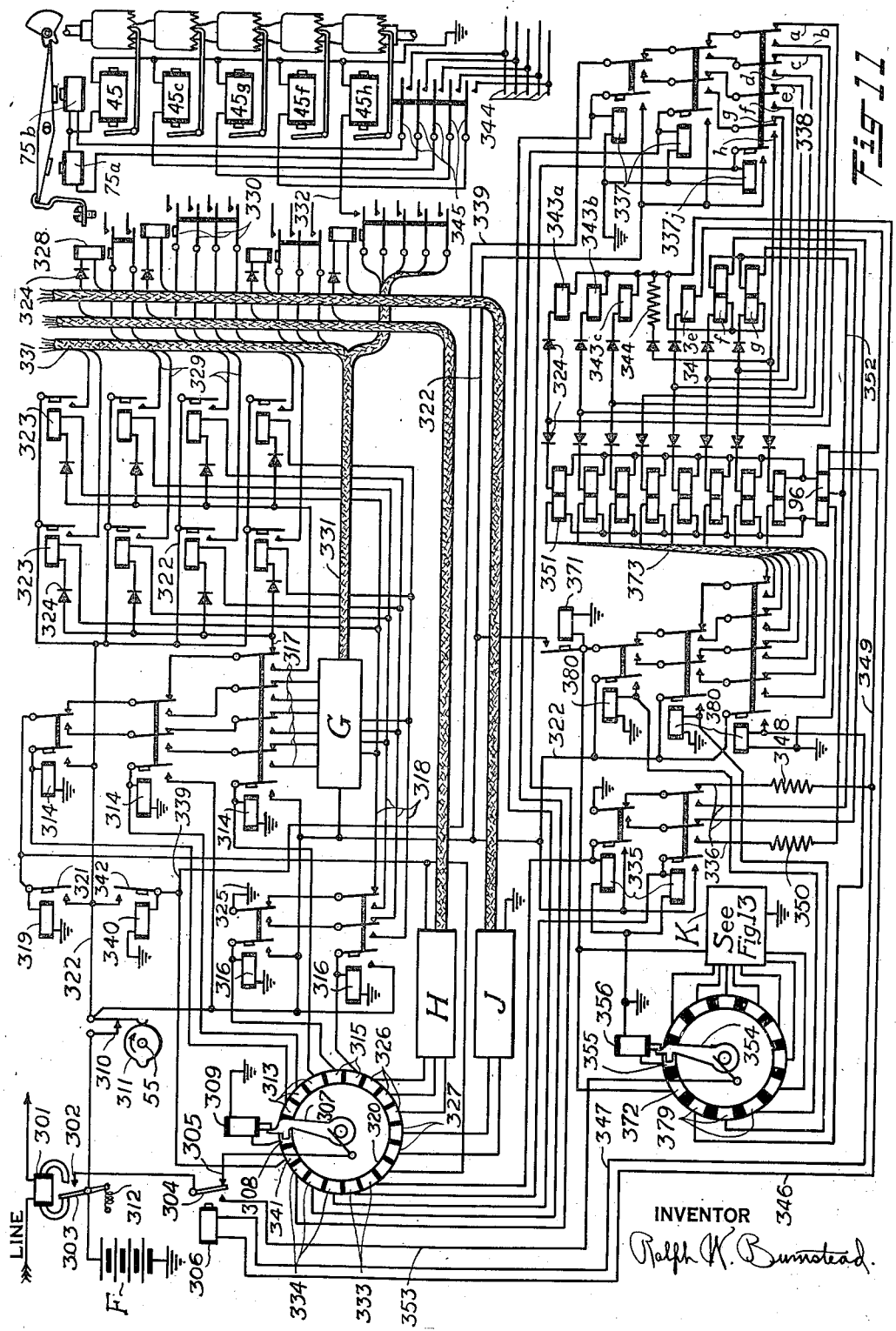

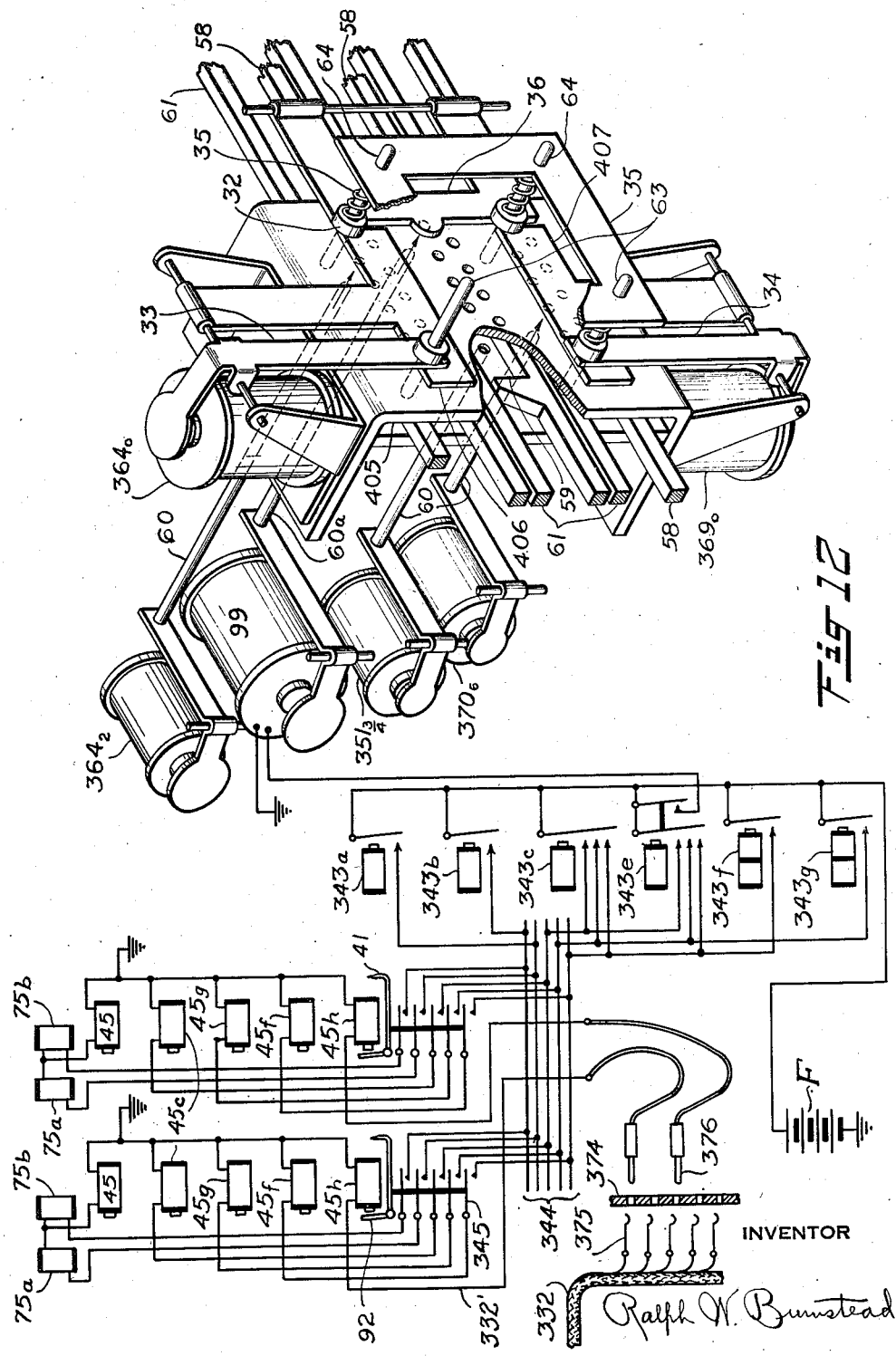

Dec. 2, 1941.   R. W. BUMSTEAD   2,264,563
SYSTEM FOR REMOTE CONTROL OF QUOTATION BOARDS
Filed Jan. 2, 1932   11 Sheets-Sheet 10
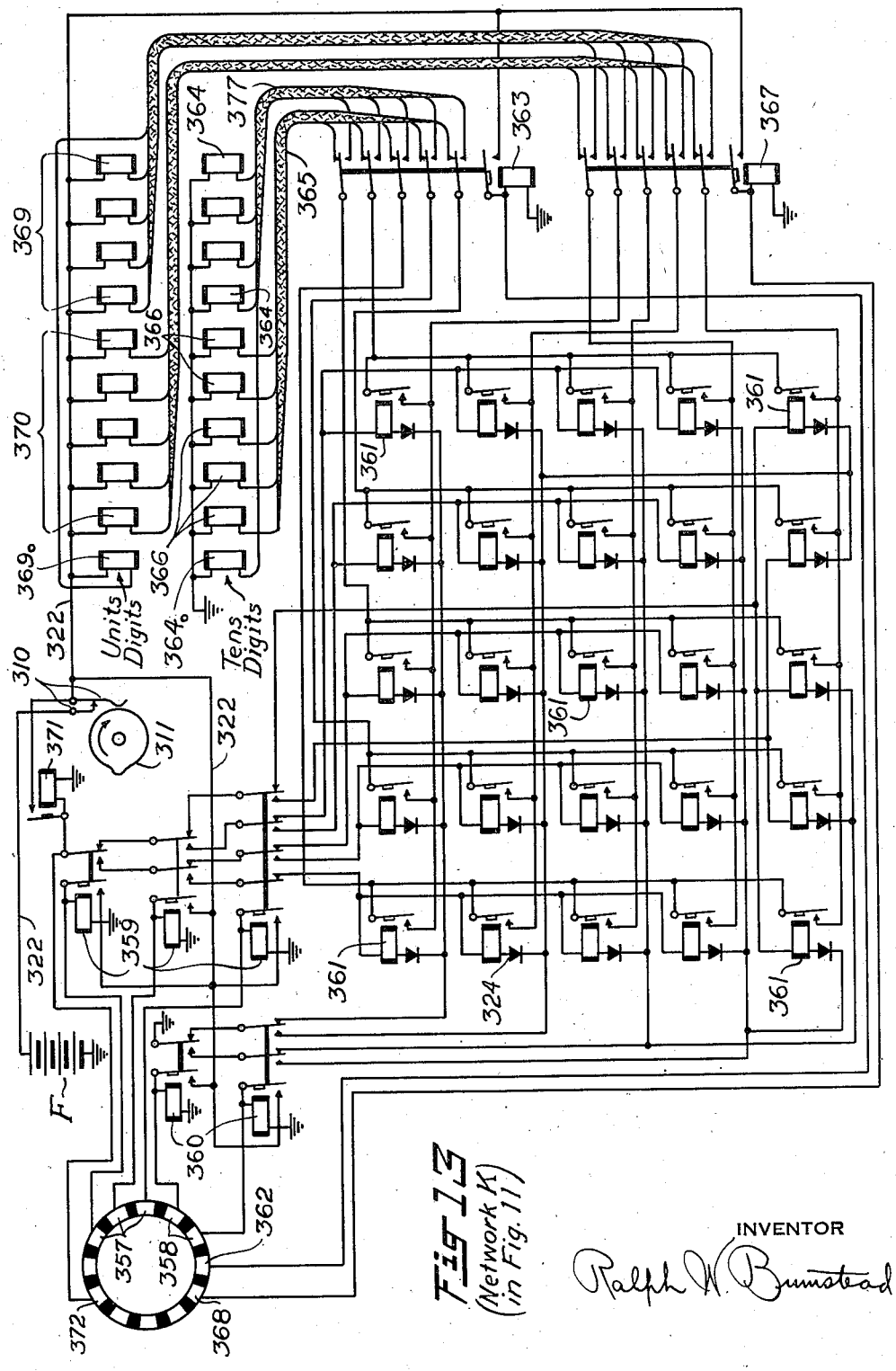
Fig. 13 (Network K in Fig. 11)
INVENTOR
Ralph W. Bumstead.

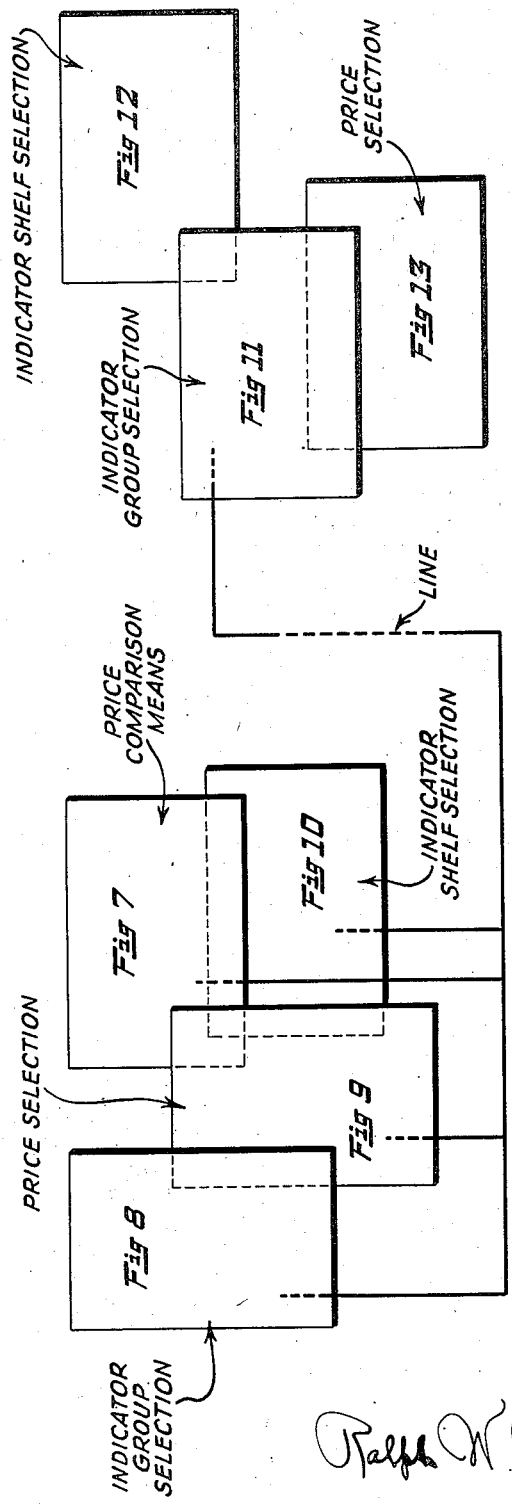

Patented Dec. 2, 1941

2,264,563

UNITED STATES PATENT OFFICE 2,264,563

SYSTEM FOR REMOTE CONTROL OF QUOTATION BOARDS

Ralph W. Bumstead, Westfield, N. J.

Application January 2, 1932, Serial No. 584,431

38 Claims. (Cl. 177—353)

This invention relates to intelligence disseminating systems and has particular reference to means and methods for simultaneous remote control of a plurality of tabularly registering quotation boards such as may be used, for example, for the indication of quotations representing transactions on stock and commodity exchanges or for the presentation of information relating to sporting events, races and the like.

An object of my invention is to provide a signaling system in which there is a central station for transmitting purposes, a communications channel such as a telegraph line or a space-radio frequency-channel and a plurality of receiving stations one of which is a master receiving station adjacent the transmitting station and associated therewith for the distinct purpose of modifying the signals by reference to previously transmitted and registered signals of like classification.

Another object of my invention is to provide a remotely controlled quotation board system in which a plurality of quotation boards may be operated from a central transmitting station and in which relatively simple indicating mechanism is disposed at each of the indicating stations; and to provide one master receiving station wherein certain essential instrumentalities are situated, these being arranged to function in co-operation with the transmitter for controlling the set-up of extreme quotations simultaneously with the set-up of market quotations.

A further object of my invention is to provide a signaling system in which the necessary signals may be transmitted for remote control of the tabularly registering receiving instrumentalities with the fewest possible signaling units.

A further object of my invention is to provide means for obtaining an automatic comparison between the set-up of a quotation and previously registered quotations of like classification whereby the quotation signal to be codified is given any one of several special characteristics, thus rendering it effective in controlling functional registers at the receiving stations to indicate new "high," or new "low" quotations.

Another object of my invention is to provide means for obtaining an automatic comparison between the set-up of a quotation and a previously registered quotation whereby a signal to be transmitted may be contracted if the difference between the two qotations compared is confined to just one of the denominational elements.

Another object of my invention is to provide means for obtaining an automatic comparison between the set-up of a quotation and a previously registered quotation whereby the transmission of a signal may be suppressed if no difference is shown by such comparison.

Another object of my invention is to provide selective mechanisms at the transmitting station for determining the characteristics of a signal to be transmitted so that various registers at the receiving stations having functional significance may be actuated simultaneously with the registers representing the "last" quotation for each stock or commodity. By functional registers is meant, for example, registers indicating the "previous close", the "opening," the "high" and the "low" prices for each stock or commodity.

Another object of my invention is to provide a system using a standardized length of signal representative of the abbreviation for a stock or commodity so that whether the abbreviation as commonly used is represented by one, two or three letters, the number of primary elements in the signal representing such abbreviation may be transmitted within a fixed time interval, such time interval being adapted to minimize the time required for transmission of the general run of quotations.

Another object of my invention is to provide selective mechanism at each of the receiving stations responsive to the received signals and adapted to select any desired group of tabularly registering quotation indicators, to predetermine which particular indicators in said group are to be actuated and to set any of the selected indicators directly from their previous setting to a new setting without the necessity for restoring such indicators to their zero or blank position.

Other objects of this invention will be apparent from the specification.

Briefly stated, my invention comprises a transmitting means, such as a keyboard or perforated paper tape transmitter whereupon the abbreviations, figures and fractions of a quotation may be set up; instrumentalities for impressing signals upon a line or other communications channel, such instrumentalities including preferably some form of distributor switch or switches actuated on the "start-stop" principle; a master quotation board responsive to transmitted signals and intimately associated with the transmitting means for test purposes whereby comparisons may be made between a quotation as set up and quotations as previously registered, so that the signals as transmitted may be modified and functionally characterized; and a plurality of receiving stations which, geographically, may be widely separated from one another, each comprising a quotation board having a plurality of stock indicator groups controlled by the actuation of a single line relay or other responsive device at each receiving station along the communications channel.

In carrying out my invention many of the practices commonly employed in telegraphy and the telephone switching art are utilized, but the means preferred are so arranged as to provide a new result. Thus, I may make use of any well-known means for keying the signals to be transmitted, such as a keyboard having signal codification means controlled by each individual key. On the other hand, I may employ a keyboard to first produce a perforated paper tape which in turn may be fed through a transmitting mechanism adapted to translate perforations into electrical impulses.

Whether transmitting by direct keying from a keyboard or by perforated tape or any other device, it will be understood that the signals as originally codified may be stored at the transmitting station and the stored effects may then be physically and automatically compared with effects previously stored in the master receiving station. Thus the signals may be further modified and characterized so that when transmitted they will have the desired effect in controlling the actuation of functional registers as well as "last"-quotation registers at each receiving station, including the master station.

While certain features of the art to which this invention pertains were disclosed and broadly claimed in my Patent No. 1,114,578, issued October 20, 1914, and while considerable advancement of the art has since been manifested, nevertheless the unavoidable complexity of any system such as this invention embodies seems to justify setting forth at the outset a few definitions which may prove helpful to an understanding of the detailed description herein following. These are the definitions:

1. *Quotation board.*—A collection of quotation indicators in which each indicator may be set to display a given quotation or other intelligence.

2. *Stock indicator group.*—A collection of indicators for one stock, commodity or the like.

3. *Denominational or digital unit.*—One of the indicating elements for displaying a single digit, decimal or any fraction which is comprised in a quotation or for displaying a single symbol.

4. *Functional indicator.*—One of the quotation indicators comprised within a stock indicator group and specifically designated for a certain type of quotation. Preferably such functional indicators are for quoting "Previous closing" price, "Opening," "High," "Low" and "Last" or "Market" price.

5. *Code signal.*—A unitary signaling element or a group of such elements in permutational arrangement having intelligence bearing significance or else having a selective function which is effective at one or more receiving stations.

6. *Marking unit.*—An elemental part of a code signal to which a receiving relay may be responsive in a specific manner. For example, an ordinary relay would respond to a marking unit by energization to draw up its armature against the front contact. A polarized relay would similarly respond by drawing up its armature to one side, say the positive pole.

7. *Spacing unit.*—An elemental part of a code signal to which a receiving relay may be responsive oppositely to its manner of response to a marking unit. For example, the spacing unit may represent an interruption of current flow in the line so as to deenergize the relay and allow its armature to be retracted against the back contact. In the case of a polarized relay the response would be that of energizing the coils to throw the armature to one side, say the negative pole.

8. *Tabular registration.*—The setting up of quotations occurring in haphazard sequence upon a plurality of quotation indicators so that the quotations appropriate to each stock or commodity may be viewed in prearranged order.

9. *Selector relay network.*—Any arrangement of relays including primary and secondary circuits therefor. Preferably some of the relays of such a network are adapted to lock themselves in adjusted positions, to select certain means for actuation, to provide a medium for remote control of such means, and to be restored to normal condition upon fulfilling their function.

In describing my invention I will first present the details of one form of indicating mechanism which is adaptable to the system as a whole and will thereafter describe the signaling system in its association with the master quotation board, and finally I shall show how the selector network is made responsive to signals for controlling the resetting of the indicators both in the master quotation board, also simultaneously in as many secondary quotation boards as it may be desired to include in the communications channel.

In the accompanying drawings:

Fig. 1 is a schematic arrangement of the complete system for transmission, reception and tabular registration of signals.

Fig. 2 is a diagram of a signaling code suitable for my system.

Fig. 3 is a fragmentary front elevation of a quotation board suitable for registrations of my signals.

Fig. 4 is a horizontal section along the line 4—4 of Fig. 3.

Fig. 5 is another horizontal section along the line 5—5 of Fig. 3.

Fig. 6 is a fragmentary side elevation of the drum dials and associated control magnets of the quotation board.

Fig. 7 shows a system of test circuits interconnecting a master quotation board and a transmitter, and constituting a price comparison means or comparator.

Fig. 9 is another transmitter relay network for codification of price signals.

Fig. 10 is still another transmitter relay network for codification of signals for selection of different shelves of indicators.

Fig. 11 is a receiving relay network for translation of coded signals into stock indicator control operations, and particularly for stock indicator group selection.

Fig. 12 shows further details of the receiving relay network, particularly for use in indicator shelf selection, part of the setting mechanism being also shown.

Fig. 13 is a receiving relay network for decoding of price signals and control of the dial setting mechanism.

Fig. 14 is a schematic diagram showing how the circuit diagrams of Figs. 7 to 13 inclusive are inter-related.

*Quotation indicating mechanism*

Figure 8:
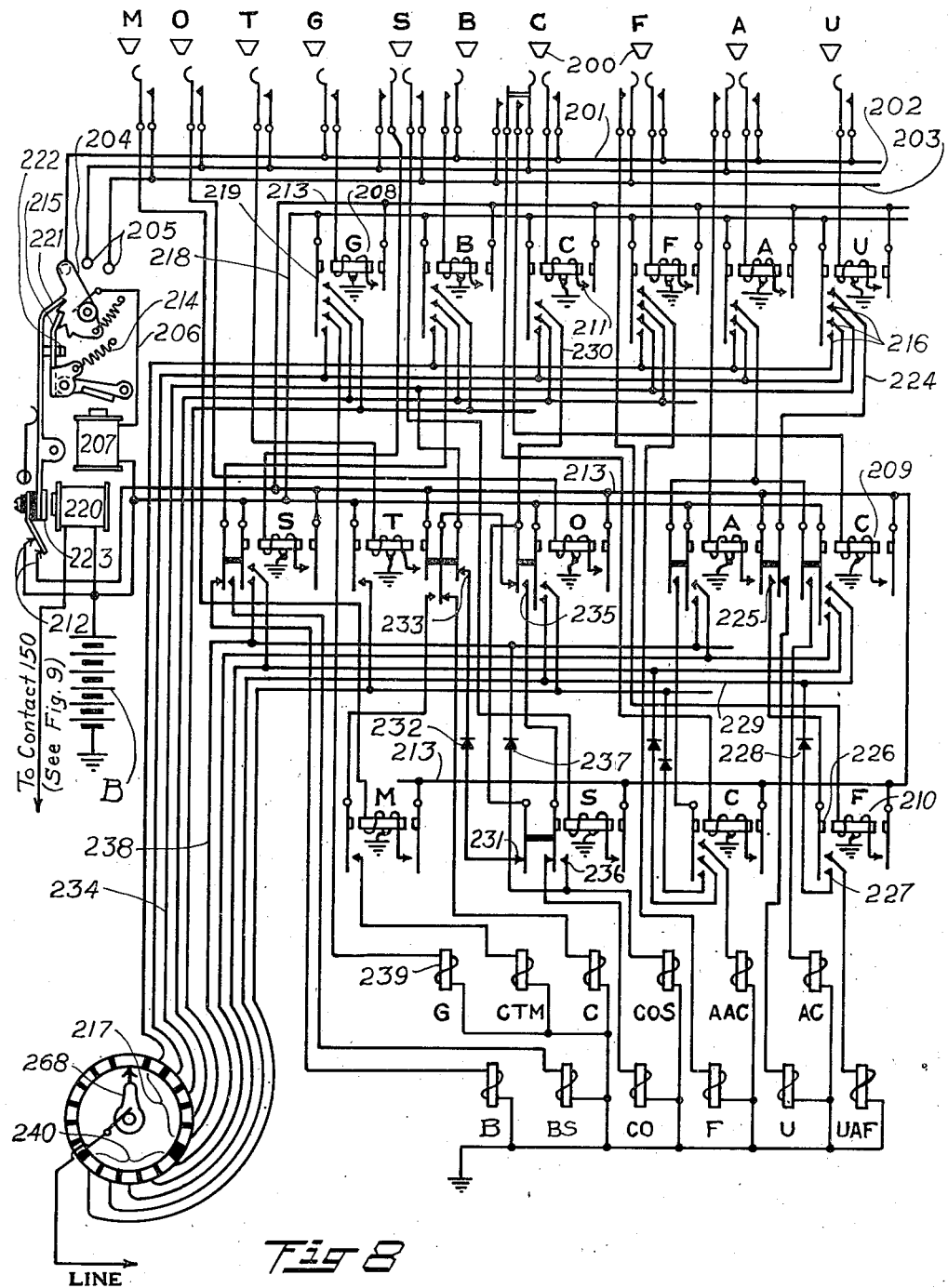
Fig. 8 is the transmitter relay network for codification of signals for stock indicator group selection.

One embodiment of a tabularly registering receiving instrument or quotation board is shown in Figs. 3, 4, 5 and 6, and will now be described for the purpose of demonstrating how the signals transmitted according to the system herein set forth may be caused to control the setting of visible indicators of stock quotations and the like.

The indicators for each stock or commodity comprise, preferably, a plurality of drum dials 39 arranged in a manner to suitably and tabularly display not only the last price but also the "previous day's close," the "opening," the "high" and the "low" prices. The number of different stocks to be quoted may, if desired, be more than a hundred, or may be limited to a very few in which the observer or subscriber to quotation board service may be particularly interested. Each stock, therefore, is represented by its own group of indicators. The indicators are selected as a group for actuation in response to that part of the received signals representing the stock abbreviation. The proper tiers of indicators are selected in accordance with the functionally designating portion of the signals and the selected drum dials are then set in accordance with the numerical part of the received signals.

According to my invention the figure drums 39 are preferably mounted on vertical spindles 48 in order that each such spindle may act as a drive shaft for selected drums representing digits of like order. These shafts are normally at rest and when actuated they may rotate through various angles according to the drum setting that is required. When the setting movement is completed the shafts are immediately restored to their initial positions.

The rotational movement of each shaft is communicated to a selected drum by engagement of a pin 47 with a web member 53 which extends between the hub 54 and the interior wall of the drum. To provide this engagement the drum is adapted to slip longitudinally of the shaft under pressure of the spring 44. When the drums are to be restrained from rotary movement they are held in an elevated position by a forked retainer 42 the prongs 41 of which are bent upwardly to engage in the notches 40 of the serrated edges of the drums. The retainer is drawn up by a spring 43 the tension of which is sufficient to overpower the reactive force of three of the springs 44 which are individual to the tens-drum, the units-drum and the fractions-drum, respectively, of a functional indicator set, that is, the three drums of one tier.

A magnet 45 serves to actuate the retainer to move it downwardly through a slight arc about the pivot center 46 against the reactive force of the spring 43. The tail end of the retainer is formed into an armature 92 to complete a magnetic circuit for the magnet 45. Each magnet, therefore, will be seen to control three drums, jointly, to lower the latter into operative association with the pins 47 which are fastened into the shafts 48.

The driving movement of the shaft 48 being in one direction of rotation only is required to be opposed by that of a hub 49 on which is mounted another drive pin 88. This pin is adapted to engage with the web member 53 on the opposite side thereof from that which is engaged by the pin 47. The notched formation of the web member 53 is such that the two pins may be swung about the axis of the shaft 48 without touching the web if the drum is in its raised position, while if the drum is lowered by the actuation of the magnet 45 then the movements of the two pins which are complementary to one another will carry the web and hence the drum in either of two directions from its initial position to the position required for a new setting.

In order to provide a rotational movement of the hub 49 counter to the direction of rotation of the shaft 48, a gear 50 is mounted on the hub 49 and meshes with another gear 51 which is mounted on the vertical shaft 52.

For each vertical panel of indicators it will now be seen that the setting movements are derived from a set of preferably six shafts, those in front carrying the drums and each of those in the rear having an extent of movement complementary to that of its front companion. The front and rear shafts may all move simultaneously in the same direction in order that the front shafts 48 and the hubs 49 may move in opposite directions.

The several tiers of indicator drums as shown in Fig. 6 are provided for a single stock indicator group and each tier has its own functional significance independent of the others. Thus, naming them from the top down, they preferably represent the "previous close," "opening," "high," "low," and "last quotations" for any stock.

From the simultaneous movement of the six shafts a complete resetting of the digital units of one or more functional indicators in any stock indicator group is possible. If, however, only the fractions dials need to be reset, only the shafts controlling the same will be rotated, so that even though the digital drums of the units and tens denomination are lowered into operative position by the actuation of a control magnet 45, they will have no tendency to be rotated and hence their registrations will be left undisturbed upon completion of the setting movement of the fractions dial.

Since each functional indicator is controlled by its own magnet 45 independently of the others, it will be seen that the dials of two or more functional indicators may be set simultaneously to corresponding positions. Thus, frequently the "market" quotation indicator setting will call for simultaneous setting of either the "high" or the "low" indicator of the same stock indicator group. Furthermore, the first quotation for the day of any stock will call for the simultaneous setting of the "opening," "high," "low" and "last" functional indicators.

As will later be shown, my transmitting system is adapted to characterize the signals so as to meet these requirements. The signals may be further characterized at the close of the market to set up the "last" quotation of each stock on the uppermost functional indicator so that on the following day it may appear as the "previous day's close." The remaining functional indicators for each stock may then be "cleared" or reset to their blank positions upon transmission of a suitably characterized signal for that purpose.

The mechanism for rotating the shafts 48 and 52 for effecting a setting movement of the indicator drums will now be described. Referring to Fig. 5, a motor 410, which may be run continuously, is provided with a clutch 94 of usual construction, having a trip device 95, arranged to connect with the shaft 55, and after driving the latter for one complete revolution to release the same. When an indicator setting is to be made and the desired drums 39 have been lowered into driving relation with the vertical shaft 48 as heretofore described, the clutch 94 is engaged under the control of the trip magnet 96 thereby causing the setting mechanism to be actuated.

One arrangement of the setting mechanism may be, as shown in Figs. 3 and 5. The motor does not drive the shafts 48 and 52 positively, but releases three springs 62 which are permitted to contract and supply the necessary driving power until restrained by certain selected stops in accordance with the intended setting movement.

Each of the springs 62 tends to drive a pair of rack bars 58, 61 in opposite directions. The rack bars carry racks 57 meshing with pinions 56 which are mounted on the vertical shafts 48, 52 for rotating the same. The rack bars are provided with lugs 65 which project into the planes of travel of the draw bars 66, 67. The rack bars are also provided with lugs 59 projecting into the area of interception with the stop pins 60, 63, 64.

By means of the trip device 95, the shaft 55 can be given one complete revolution whenever a drum setting operation is to be effected. The turning of shaft 55 which carries the gear 68 meshing with gears 69, which are mounted on the shafts 70, causes the latter to be rotated. Thus a movement of the cranks 411 is effected whereby the connecting rods 71 in the first half revolution move the draw-bar 67 to the right while the draw-bar 66 is moved to the left. In this manner the rack bars 58, 61 are permitted to slide horizontally, each in a direction opposed to that of its companion, until arrested by the interposition of selected pins 60, 63, 64 into the area traversed by the lugs 59.

A framework 31 is provided with slots 73 within which the pins 72 may be guided so that the draw-bars 66, 67 may be kept properly positioned with respect to the lugs 65.

While the draw-bars are given a full stroke first one way and then the other as controlled by the cranks 411, the rack-bars 58, 61 are permitted to move only so far as is governed by the pins 60, 63, 64. Only one pin is selected, however, for arresting a pair of rack bars and hence the extent of movement of each rack bar is complementary to that of its companion. It will be seen, therefore, that by means of the selectivity of operation of the pins 60, 63, 64, any desired angle of rotation of the vertical shafts 48 may be obtained, each independent of the others. Furthermore, the angle of rotation of any shaft 52 will always be complementary to that of its companion shaft 48.

Upon effecting a setting movement as above described, during the turning of the cranks 411 through one half revolution, the second half revolution thereof effects a restoration of the entire setting mechanism to its initial position, leaving the indicator drums to be locked into the new settings by the uplifting of the retainers 42. This setting mechanism has the advantage over other arrangements in that after the selecting pins have been positioned to control the movement of the rack bars, the denominational units may be set simultaneously. The time allowance, therefore, for such a setting movement can be very much reduced as compared with the time that would be required for setting the denominational indicators successively.

The upper group of stop pins 60, 63, 64 controls the rack bars 58, 61 for the tens-denomination. Normally, the pins 63 and 64 are interjected into the path of the lugs 59 while the pins 60 are held withdrawn from said path. The pin 63 may alone be withdrawn without withdrawing the pin 64 in which case a full stroke is permitted for the rack bar 58 while the rack bar 61 is restrained from any movement by the pin 64. Such would be the operation of the rack bars for setting the tens-drum to indicate "0." This operation may be reversed by withdrawing the pin 64, leaving the pin 63 interjected in the path of movement of the rack bars, in which case the tens-drum would be set in its "clear" position. For any other setting of the tens-drum not only is one of the pins 60 interjected into the path of movement of the racks but both of the pins 63 and 64 are withdrawn. The operation is as follows:

After a sufficient movement of any pin 60 (see Fig. 12) to enable it to stop the rack bars in a selected position, the pin is driven still further through one of the holes in the frame-plate 405 and pushes against an actuating plate 406. Each of the pins 63 and 64 is provided with a shoulder 32 on one side of which is a spring 35 to hold the pin normally in the path of the lugs 59. On the other side of the shoulder is an actuating bar 33 or 34, either of which may be actuated to independently withdraw one of the pins alone while the actuating bar 406 common to the two pins 63 and 64 serves to withdraw both simultaneously by reason of the follow-through motion of any of the pins 60. The selection of any one of the pins 60 in the upper bank thus provides for the setting of the tens-drums to indicate any one of the figures "1" to "9," inclusive.

A similar arrangement of pins 60, 63 and 64 is provided in the lower bank for controlling the units-drums.

The central group of pins 60 controls the setting of the fractions drums. In accordance with the preferred embodiment of my invention, only nine such pins need be provided, since the operation of setting the fractions-drums would never need to be prevented by pins such as 63 and 64 of the tens-denomination. The nine pins 60 of the fractions setting mechanism represent respectively (from left to right) "—," ⅛, ¼, ⅜, ½, ⅝, ¾, ⅞, "clear."

With the setting mechanism arranged as herein shown it is thus possible either to control the setting of the tens, units and fractions drums simultaneously or to restrain them while setting the fractions-drums alone.

Fig. 12 shows in perspective a portion of the setting mechanism which includes some of the stop pins 60, 63 and 64 and the control mechanism therefor.

The operation of "clearing" the registers is performed as follows: Upon selection of the clear relay 343e a circuit is closed through each of the functional indicator selector magnets 45c, 45g and 45f for "opening," "high" and "low" indicators respectively. The "market" indicator is always selected. Simultaneously the magnet 99 is energized which interjects pin 60a into the path of the lugs 59 for setting the fractions dials in the clear position. The stroke of the pin 60a is followed through so as to actuate the yoke piece 36 whereby both of the pins 64 are withdrawn. The rack bars 61 of the tens and units dial control are therefore permitted to make an extreme movement to the left until arrested by the pins 63. It will be noted that the yoke piece 36 only partially surrounds the pins 64 so that they may be withdrawn without moving the actuating plates 406 and 407. Thus the pins 64 may be withdrawn together as required for clearing the registers or they may be withdrawn independently of one another when actuated for any other setting by pressure of one of the pins 60 against either of the actuating plates 406, 407.

It will be clear that the same sort of driving mechanism and the same arrangement of indicator drums herein shown for the tens and units figures might readily be used for the hundreds denomination. For the sake of simplicity of the mechanism, however, I have provided a unique and practical arrangement for exhibiting a hundreds-digit of a quotation. The setting mechanism for this digit is preferably controlled jointly with the selection of the functional indicator which is provided for the "previous closing" price.

It rarely occurs in practice that a stock quotation will vary over a range of more than one hundred points. Hence it is generally possible to predetermine the two hundredths digits such as "0" and "1" or "1" and "2" which will be adequate to fully display the "previous closing" price for any stock according to its possible range over a long period of time. This possibility enables me to use two or more functional indicator signals selectively for setting up the "previous closing" price and the alternative use of such signals can be for the purpose of setting a target 112 in a selected position to properly indicate the hundreds figure of the quotation. Thus, the code signal XXXXX may be used on one occasion to select magnet 75a for throwing the target 112 into position to indicate "1" where the closing price is at 100, or above. On the following day, however, the same stock may close at 99½, in which case the code signal XXXX— may be used to select magnet 75b for throwing the target 112 to another position. The mechanism for this setting movement comprises a spindle 138 upon which the target 112 is swiveled. The rear of the target carries two prongs 139 forming a yoke in which the lever 140 is adapted to swing either to one side or the other according as the armature 141 is attracted by magnet 75a or 75b. The spring 142 is compressed between the armature 141 and the bracket 143 so that the lever 140 is pressed against the target member 112 on either side of a dead center to retain the target in the desired indicating position after an impulse through one of the setting magnets has done its work and ceased. It will thus be seen that the armature 141 can be tilted either way to reverse the setting of the target 112 so as to display its designations selectively.

The signaling code

Fig. 2 shows only one of numerous possible arrangements for codification of the signals necessary to select and remotely control the stock quotation indicators of my invention. This code is, therefore, to be understood as merely illustrative of any permutational system which would be suited to present day requirements for quoting stocks. In tabular array the marking and spacing units for successive signals are readable along any horizontal line or lines and the meaning of any permutation may be understood from the reference characters adjacent thereto.

As will presently be shown, the code signals may be transmitted and received through distributor switches of the type generally employed in the printing telegraph art. At my transmitter station, and also at each receiving station, I preferably employ two distributors. The first of these distributors is provided with sufficient segments for transmitting and receiving a train of three distinct signals of five units each. Two of such signals are for the purpose of stock indicator selection and the third signal may be for functional indicator selection within any stock indicator group. The second distributor preferably has fewer segments than the first and is useful for transmitting and receiving code signals of numerical significance. The distributors are adapted to be operated by start-stop motions duly synchronized in the usual manner as between sending and receiving stations. The excursion of the brush of the second distributor follows that of the first distributor only when it is necessary to transmit an unabridged set of signals representing the stock abbreviation, the functional indicator selection, and the tens-, units-, and fractions signals of a quotation.

When it is possible to omit the signals for the tens- and units- digits, the signal for the fraction may be combined with that of the functional indicator selection and thus the use of the second distributor is avoided while transmitting abridged quotations. In practice, a very large proportion of indicator settings is confined to the fractions dials, for which reason my device to eliminate the use of the second distributor whenever possible results in a very considerable economy of line time and a corresponding increase in the transmitting capacity of the system, measured in quotations per hour.

Referring to the first two columns of five-unit code signals shown in Fig. 2, I have shown the possibility of using any of the letters A to M inclusive as the initial letter of an abbreviation and any of the letters N to Z inclusive as the second letter thereof, for designation of the stock to be quoted. In practice, however, no such limitation is imposed upon the use of the literal signals, since it is obvious that any one of letters of the alphabet may be used either as the initial or the second letter. The blank (—) signal and signals for several other characters may also be used in either the first or second position so that, in fact, a possible choice of combinations up to 32×32=1024 is available for stock indicator selection. Under present conditions there appears to be no considerable demand for quotation boards of greater capacity than to quote 300 stocks.

Notwithstanding the fact that one- and two-letter abbreviations might be more generally used in the stock quotation service, three- and four-letter abbreviations also are commonly resorted to as tending to suggest more readily to the public the full names of the stocks represented. One of the problems solved by my invention, therefore, is to enable a key-board operator to follow the abbreviations of the ticker-tape in setting his keys for transmission of the signals for stock indicator selection and to provide automatic means for translating his keyboard set-up into stock selecting signals of uniform length. This feature will presently be further explained. For the present, it will be understood that since two-letter combinations provide a now-practical range of selectivity, my sending and receiving equipment is preferably adapted to use selective code signals having a two-letter significance.

The first distributors serve, after transmitting and receiving the two 5-unit signals, for stock selection to make the functional indicator selection. The choice of the 5-unit signals suitable for this purpose is shown in the third column of Fig. 2. It will be understood that a third group of five segments is provided on the first distributors for sending and receiving these signals. When the "previous close" indicator is to be selected, either of two signals may be used in order that the target for the hundreds-digit may be simultaneously controlled, as has already been explained. The signal composed of five marking impulses (identified in Fig. 2 by white spots on the bars), may be used to set the indicator when the quotation is at 100 or above. The signal identified by vertical lines across each marking unit may be used for setting the "previous close" indicator to a quotation below 100. If the price range of any stock tends to vary between 100 and 200, then a target bearing the numerals 1 and 2 for the hundreds-digit can be provided in the indicator for that stock. In that case the signal XXXXX would designate 200 and above while XXXX_ would designate a quotation below 200.

The signals for functional indicator selection are adapted by their characteristics to cause the second distributor either to operate or to be non-operative according to requirements. It will operate for each of these signals except the four which appear in the diagram below the designation "clear." The operation of clearing the registers is initiated by a special key of the keyboard whereby provision is made for preventing an excursion of the second distributors. Otherwise the functional indicator signals commencing with two successive marking units are adapted to control the second distributors of the receiving stations so that their brushes will make an excursion immediately following the operation of the first distributors. The second distributor of the sending station will also be tripped in synchronism with the others for transmission of signals comprehensive of the tens-, units- and fractions denominations of a quotation.

The first five segments of the second distributor control the selection of setting positions for the tens- and units drums cooperatively. Three of the signaling units have effect upon the receiving relay network in selecting the tens- figure and the two remaining units select the units-figure. Since the number of permutations of marking and spacing units is limited to $2^u$, where the exponent $u$ is the number of signaling units employed, it is obvious that the 5-unit code would provide only $2^5=32$ combinations, which is inadequate for the choice of any one of one hundred numerical indications.

According to the system herein shown only twenty-five of the possible thirty-two permutations are utilized for the primary selection of a number, but this selectivity is quadrupled by using two additional distributor switch segments upon which marking and spacing signals may be impressed. Thus, in the positions of the first three signaling units the signals for "00" and for "50" are the same, and there is correspondence between the signals for "10" and "60," "20" and "70," etc. The lower one of the two tens- figures in each case is chosen by a spacing unit on the sixth segment of the distributor; and the higher tens- figure is chosen by a marking unit impressed upon the same segment.

For the purpose of units- numeral selection two signaling units (the fourth and fifth segments) provide four permutations which are assigned to the numbers "0" to "3" inclusive and correspondingly to the numbers "5" to "8" inclusive. Numerals "4" and "9" are designated by interchanging the fourth and fifth signaling units with the first and second respectively. No confusion of signals results as between tens- and units- denominations because the existence of an interchange is denoted by marking units on both the first and the second segments, a combination not otherwise employed in that position. Furthermore the receiving relay network is readily adapted, as will hereafter be shown, to the alternative use of the first three or the last three segments under consideration for denoting the tens- numeral of a quotation.

The seventh segment has impressed upon it a spacing impulse when the units- numeral is "0" to "4" inclusive and a marking impulse when it is any of the numerals "5" to "9" inclusive.

From the above it will be understood that the signal for any tens- numeral may be transmitted through segments identified in Fig. 2 either by the squares marked "T" or by the specific code combinations shown opposite the numbers "10" to "00." Likewise the units-figure may be transmitted through segments marked "U," or according to the specific code combinations shown opposite the numbers "0" to "9" inclusive. Hence, any number from 0 to 99 may be signalled on the seven segments provided therefor.

The signal for setting the fractions-drum follows that which has just been described. It being customary to quote stocks in eighths of a point, I have provided only three segments of the second distributor for the eight permutations of marking and spacing units necessary to quote the fraction. These permutations are shown in the last column of Fig. 2.

As previously intimated, the second distributor is not called into play when merely a fractional difference occurs between a new quotation and the previously registered quotation of the same stock. The new quotation may, however, be either a new "high," a new "low" or simply a new "last" quotation between previously established limits. Referring again, therefore, to the first distributor, it will be seen that any one of the 3-unit code signals for "eighths" may be transmitted through the 3rd, 4th and 5th segments of the group otherwise reserved for functional indicator selection. When the first distributor is used in this manner the only functional indicators which can be selected are the "high-and-last," the "low-and-last" or simply the "last." In Fig. 2 the signals for these three requirements are shown as occupying the last three lines in the third column of the diagram. There the words "high," "low" and "last" appear occupying the space of three signaling units which are available for transmitting the fractions signal. This part of the diagram is intended to show how the signal for any fraction may be preceded by a marking unit on the second segment of the third group of segments of the first distributor to characterize the signal for controlling the "high" and "last" fractions drums together. Similarly a marking unit on the first segment of the same group serves to control the "low" and "last" fractions drums together. And, further, two spacing units preceding the fractions signal serve to characterize it for setting the "last" fractions drum alone.

*The abbreviation-code transmitter*

Referring now to Fig. 8, the transmitting network for codification of the signals representing stock abbreviations will be explained. For illustrative purposes, some of the keys 200 of the keyboard 4 are shown at the top of the diagram. Each key is provided with one or more pairs of contacts, one contact of each pair being connected to one of a plurality of bus-wires 201, 202 and 203, respectively. A step-by-step switch-blade 204 is adapted to contact successively with terminals 205 for each of the bus-wires. A common feed wire 206 supplies energy from the battery B through the magnet 207 so that, when a letter-key is depressed, current is fed through this magnet and to either one or another of the pairs of key-contacts, whence it is led to an appropriate relay 208, 209 or 210, the coils of which are grounded.

The keyboard operator depresses his keys successively to represent a stock abbreviation according to the ticker tape which he is assumed to be reading. Immediately upon depressing any key it will be seen that an appropriate relay is actuated and locked into its set position by a locking circuit 211, which may be traced from the battery B through the circuit-breaker contacts 212 and the bus-wires 213. When the key is released, the actuating circuit that was closed through the key-contacts is broken, and, although the selected relay 208, 209 or 210 remains locked, the magnet 207 is de-energized, allowing the spring 214 to retract the pawl 215 so as to move the switch-blade 204 one step. By this it will be seen that the first depression of a letter key to set up the code signal for a stock abbreviation selects one of the relays 208, the second key-depression selects a relay 209, and the third key-depression selects a relay 210.

It will be remembered that two signals of uniform length are intended to be transmitted for selecting any stock indicator group and that each of these signals comprehends a permutation of five signaling units. Each transmitted signal may represent a letter but not necessarily the same letter that is set up on the keyboard. An arbitrary scheme of translation is provided by my preferred transmitter network.

The composition of a desired signal may be traced for illustrative purposes by following any of the connections between contact points 216 and the segments 217 of the first distributor. Any combination of these segments may be connected to the battery B through the bus-wire 218 and relay contact springs 219. The segments remain connected to the battery B so long as the relays 208, 209, 210 are energized by their locking circuits. The breaking of the locking circuit is accomplished (as will hereinafter be more fully explained) by the completion of the signal transmission for any stock quotation, this being effected by the release relay 220 which opens the circuit at the contact points 212. This release relay also functions to restore the switch-blade 204 to its initial position. This is accomplished by disengaging the pawls 215 and 221 from the teeth of the switch-blade 204. A detent 222 connected to the pawl 221 is so arranged that when the armature 223 of the magnet 220 is actuated both of the pawls are disengaged.

Fig. 8 shows examples of progressive composition of the signals where it is desired to transmit a signal of uniform length to represent an abbreviation of either one, two or three letters. If the customary abbreviation is one letter, say "U," none of the five segments 240 of the second group will be fed with current because no contacts will be closed through the operation of any relay 209. The "U" relay for the initial letter, therefore, simply connects the first three segments in the first section of the distributor switch for the transmission of three marking units representative of the letter "U."

Assuming, however, that the abbreviation to be transmitted is "UAF," it will be seen that the operation of the A-relay 209 puts current on the first two segments of the second section of the distributor switch, and also provides a path through the connection 224, contact 225 of the A-relay 209 to the contact spring 226 of F-relay 210. Contact 227 then carries current through the unidirectional device 228 to the conductor 229 which connects with the fourth segment of the second group on the distributor switch. The second five-unit signal therefore is changed from an A-designation to a J-designation. Hence the signal actually transmitted for the selection of the "UAF" stock indicator group is "UJ."

Another example of translating the signals for the usual abbreviations into selective signals of uniform length may be observed by following the circuits to the distributor switch segments 217 and 240 according as they are closed by the C-relay 208, the O-relay or the T-relay 209, and the M-relay or S-relay 210. If the stock abbreviation is "C," the C-relay 208 will be actuated alone. In this case current is fed to the second and fourth segments 217 directly, also to the third segment 217 indirectly through conductor 230, back-contact 231 of the S-relay 210, unidirectional device 232, back-contact 233 of the T-relay 209 and thence to conductor 234 which feeds the said third segment 217. The signal for the letter "C" may therefore be transmitted without modification either in connection with the abbreviation "C" or the abbreviation "CO."

When the "O" relay 209 is actuated, the fourth and fifth segments 240 (representing the signal for "O") are connected to the battery and a circuit is only partially established through front contact 235 to one of the movable contact springs of the S-relay 210. The signal which is transmitted, therefore, represents the abbreviation "CO."

When the abbreviation is "COS", the actuation of the S-relay 210 breaks the circuit to the third segment 217 by deadening the back-contact 231 of this relay. The first part of the signal, therefore, becomes an "R" instead of a "C." The S-relay 210 further closes the circuit through its front contact 236, unidirectional device 237 and conductor 238 to the first segment 240. This modifies the second signal making it "B" instead of an "O."

When the abbreviation is "CTM" the actuation of the T-relay 209, following that of the C-relay 208 causes current to be omitted from the third segment 217 so that the signal transmitted represents "RT."

In a similar manner the circuits controlled by the selector relays 208, 209, 210 may be caused to effect any one of a variety of modifications as between marking and spacing units either by putting battery onto additional segments or by deadening one or more segments. In view of the numerous combinations of two letters which are not commonly used in the ticker service it may be said generally that under present conditions there is an adequate number of such available combinations into which any needed single-letter or three-letter abbreviation may be translated.

Further possibilities of translating an abbreviation of one or of three letters into a signal having the duration of a two-letter abbreviation, may easily be arranged in accordance with the method herein disclosed. The drawing merely represents the following typical examples:

| Usual abbreviations | Code-signaling segments | | Translation |
|---|---|---|---|
| | 217 | 240 | |
| G | — X — X X | — — — — — | G— |
| CTM | — X X X — | — — — — X | RT |
| C | — X X X — | — — — — — | C— |
| COS | — X — X — | X — — X X | RB |
| AAC | X X — — — | X X X — X | AQ |
| AC | X X — — — | — X X X — | AC |
| B | X — — X X | — — — — — | B— |
| BS | X — — X X | X — X — — | BS |
| CO | — X X X — | — — — X X | CO |
| F | X — X X — | — — — — — | F— |
| U | X X X — — | — — — — — | U— |
| UAF | X X X — — | X X — X — | UJ |

In addition to the circuit connections for signal transmission, Fig. 8 also shows a plurality of stock indicator selecting magnets 239 which are provided only in the master quotation board. In the description presently to follow covering test circuits of the master quotation board it will be seen that only in the master quotation board is it necessary to actuate the stock selecting relays 239 prior to the transmission of the signals over the line. One such relay 239 is therefore provided for each stock indicator group in the master quotation board and a selection thereof is effective immediately upon depressing the keys representative of a stock abbreviation. If, as in the case of the possibility that the initial letter "C" does not at first select the desired indicator group, the subsequent depression of the other keys for actuating the relays 209 and 210 will immediately release the C-relay and energize the CO-relay or the COS-relay 239. In any event, before the starting key 38 (Fig. 9) is depressed, the selection is properly effected according to the stock to be quoted.

From the above it will be observed that the circuit arrangements of Fig. 8 are illustrative only and the application of the general principles involved is capable of a wide expansion. I have, therefore, disclosed a method of translating known and commonly used abbreviations of varied length into suitable signals of uniform length for the purpose of stock indicator selection.

The price-code transmitter

Referring to Fig. 9, some of the price keys 1, 2 and 3, of the keyboard 4 are shown and each is in position to close a relay circuit pertaining to the price-signalling network. Other contact springs required to be actuated by these keys for purposes hereinafter explained are, for the sake of simplicity, omitted in Fig. 9.

Current is fed from the battery C to a contact spring 241 of the starting key 38 which, when depressed, puts potential on conductors including contact 242, armature 243 of relay 12, back contact 244, and bus wire 245 common to the contacts 102 of all of the keys 1, 2 and 3.

As shown in Fig. 1, there are ten of the keys 1, for selecting any of the tens-digits; ten keys 2 for selecting any of the units digits and eight keys 3 for selecting a fraction to be signalled. The control circuits leading from contacts 101 of the tens-keys 1 are carried in a cable 246 to the five relays 247 each of which has two coils.

For transmitting any of the signals for the tens-digits "0" to "4" inclusive, the left-hand coils of the relays 247 are selectively energized. The energizing circuit is carried thence through a resistance 248 which is grounded. The right-hand coils of relays 247 are selectively energized for transmitting the signals for "5" to "9" inclusive. In addition to the selected coil, relay 249 is also actuated so as to transmit a marking impulse as an additional component of the signal (on segment 255) to differentiate the same from corresponding signals for "0" to "4" inclusive. See Fig. 2 which has already been explained. The resistance 248 is preferably equal to the impedance of relay 249.

A common conductor 250 from battery B puts potential constantly on the movable contacts 151 of the code-composing relays 247, 249, 251, 252 and 253. The companion contacts 154 of these relays are normally connected with segments 254, 255 and 256 of the second distributor. When, however, the signal is to be curtailed by omitting to actuate the second distributor, the fraction alone may be designated by the composition of a signal impressed by any of the relays 253 on any or all of the three segments 265 of the first distributor switch. The transfer of this fractions-signal is determined by the relation between the quotation as set up on the keyboard and the next previously transmitted quotation of the same stock. This matter will presently be dealt with in greater detail. It is sufficient to state here that one of the functions of relay 7 is to make this transfer as required and that when relay 7 is to be actuated such actuation will be in advance of the depression of the starting key 38.

Referring specifically to the code-composing relays 247, 249 and the connections of their contacts 154 with the segments 256 of the second distributor it will be noted that conductor 257 leads directly to the middle one of the five segments 256.

Conductors 258, however, lead to contact springs 259 on the relay 251d representing the units figures "4" and "9." From reference to the foregoing description of the signaling code it will be understood that this relay gives effect to an interchange of connections between the first and second segments 256 and the fourth and fifth segments 256u. Thus the signal comprising three units which is impressed upon three of the segments 256 for signifying the tens numeral may occupy either the first three or the last three positions on these segments, the actuation or non-actuation of the relay 251d being effective in determining the proper connections. These connections may easily be traced upon reference to Fig. 9 where it will be seen that, when the movable contact springs of the relay 251d are in contact with their back-contact companions, the signal for the tens figure will be impressed upon the first two and the middle segments 256. On the other hand, if the relay 251d is actuated, the first and second units of the tens figure signal will be transferred respectively to the fourth and fifth segments 256u through the front contacts of the relay 251d.

Referring now to the network controlled by the keys 2 for the units-denomination, it will be noted that in place of one of the relays 251 a resistance 260 is provided for the reason that, in transmitting the signal for "0" or for "5" in the units-denomination, both of the segments 256u are deadened as for the designation of "spacing" units. Hence there is no connection with the "0" key and the "5" key connects directly through the resistance 260 to the signal modifying relay 252 which impresses an additional marking unit upon segment 263 of the second distributor for the purpose of distinguishing any of the units numerals "5" to "9" inclusive from the numerals "0" to "4" inclusive that share in common the first component representing two units of the signal.

Actuation of relay 251a puts potential on the first of the two segments 256u for signaling either "1" or "6." Relay 251b prepares the second segment 256u to transmit a marking unit in case the units-numeral is either "2" or "7." So, also, relay 251c serves to put potential on both of the segments 256u when the signal to be transmitted represents either "3" or "7." Relay 251d transposes the connections from the tens-relays and the units relays when either of the unit figures "4" or "9" is to be transmitted and, furthermore, this relay impresses potential upon the first two segments 256 in accordance with the code for these units-numerals. The connections between the contact springs of these relays and the distributor-switch segments may easily be traced without further description.

The right-hand coils of relays 251 are connected one way with their respective key contacts of the units-keys 2 representing numerals "1" to "4" inclusive. The other way, these coils are grounded through the resistance 262.

The left-hand coils of relays 251 are also connected one way with their keys 2 representing numerals "5" to "9" inclusive, and the other way they are in series with relay 252 which serves when energized to put potential on segment 263 for differentiating between any of the units-denomination signals of the lower and higher series respectively.

The relay network for composing the signal to be transmitted in representation of the fraction comprises eight keys 3 but only seven relays 253. No relay is necessary for the transmission of a signal representing a blank since the three signaling units for that character are spacing units.

The depression of any key 3 (other than for the symbol "—") energizes one of the relays 253 to put potential on one or more of the conductors 264 according to the marking units by which the segments of the rotary switch are to be characterized.

Relay 7, the control of which is hereinafter explained, directs the current from the conductors 264 through its movable contacts 266 either into the first or the second distributor switch according to the predetermination of whether the full signal or a curtailed signal is to be transmitted. If relay 7 has not been actuated, that is, if the full quotation needs to be transmitted, then the fractions signal will be set up on the segments 254 of the second distributor switch. Upon actuation of the relay 7, however, as in the case of transmitting an abridged signal covering a stock abbreviation and fraction only, the fraction signal will be set up on segments 265 of the first distributor switch. The connections between the front and back contacts cooperating with contacts 266 of relay 7 may be easily traced through to the segments 254 or 265 by following the same in Fig. 9. The code signals for fractions, it will be recalled, have heretofore been explained in connection with Fig. 2. Thus it will be seen that any one of these code signals may be set up for transmission by depression of the proper key 3.

*The starting key*

The starting key 38 shown in Figs. 1, 7 and 9 has several functions to perform. Firstly, it enables the preselection of a stock indicator at the master quotation board to be made before signals are transmitted over the line. In other words, no current is put upon the circuits controlled by the code composing relays 247, 249, 251, 252 and 253 until after certain test circuits have been established through the master quotation board for determining the characterization of the signal so that it will be effective when setting the proper functional indicators for a given stock.

The closing of the circuit by the starting key 38 to put battery potential upon the common conductor 245 (see Fig. 9) whence current is fed to the proper relays for composing the numerical part to the signal has already been explained. A further function of the starting key 38 is to energize the release-magnet 267 which trips the brush arm 268 of the first distributor switch and allows it to make an excursion of one complete revolution. The circuit for magnet 267 may be traced from battery C through contacts 241 and 242 of the starting key 38, thence through contacts 243 and 244 of relay 12, conductor 269, distributor segments 270 and 271 which are bridged by the brush 278, thence to the magnet 267 which is grounded. As soon as the brush 278 leaves the segments 270 and 271 this circuit is, of course, broken to restore the magnet 267 to its normal position so that it may arrest the brush arm 268 after it has made one complete revolution. A catch arm 272 is provided for locking the key 38 in its depressed position until the signaling of a quotation has been completed and in order that a circuit may again be established from the battery C to segment 270, the same as before, but just previous to the completion of the excursion of the brush arm 268, by way of bridging the distributor segments 270 and 273 through brush 278. In case the full signal is to be transmitted, current momentarily flows from segment 273 to trip magnet 274 of the second distributor. This circuit is completed through segments 279 and 280 which are bridged by the brush 384. Segment 280 is grounded. It will be seen that when the brush 384 leaves the segments 279 and 280 the circuit will be broken and the trip magnet 274 will be restored to its normal position so as to arrest the distributor switch arm 285 after it has made one complete revolution. If, however, relay 7 has been actuated, this circuit is not completed through the trip magnet 274 but can be traced through back contact 275 of relay 7, thence through resistance 276 to the starting key restoring magnet 277. Magnet 277, when energized, retracts the catch arm 272, thereby permitting the starting key 38 to be restored to its normal position.

When the brush arm 285 of the second distributor has nearly completed its excursion the segments 281 and 282 will be bridged by the brush 384 so as to complete a circuit from the battery C through conductor 269 as previously described, and thence through the said segments 281, 282 to resistance 276 and starting key restoring magnet 277. By this operation the restoration of the starting key is delayed until both distributor switches have made their excursions.

If no signal is to be transmitted, due to the correspondence of a quotation as set up on the keyboard with the previously transmitted quotation for the same stock, then it is obvious that neither of the distributor switches should be actuated; in which case, as will be hereinafter shown, the non-signaling relay 12 will be actuated by the test circuits of the master quotation board so that current from battery C will be fed through the contacts 241 and 242 of the starting key 38, thence to the front contact 283 of relay 12 which feeds the lamp 284 located adjacent the keyboard as an indication to the operator that no signal is to be transmitted. This circuit is completed by passing through the starting key restoring magnet 277 so that the key 38 is almost immediately restored after the flash of the lamp 284. By this operation the operator is apprized of the fact that he can immediately set up a new quotation on his keyboard.

*The test circuits and signal-modifying system*

Fig. 7 shows schematically some of the numeral keys 1, 2, and 3, of the keyboard 4. The connections of the key-contact springs with the relay network suitable for composing the code signals; and with a multiplicity of rotary switches are also shown. These rotary switches will be understood to be included only in the master quotation board. Their function is to provide a means of comparison between quotations as set up on the keyboard and as previously registered. For such comparisons the rotary switches are necessarily duplicated with respect to each stock which is to be quoted. For the sake of simplicity only two stock indicator groups are shown in Fig. 7, whereas a large number of such groups, and commonly two or three hundred of them would be required. One group appears to the left of the dividing line c—c and preferably includes nine rotary switches each representing a digit or fraction. Those for the "high" price indicator are on the upper level; a corresponding set of switches for the "low" price indicator appears on the middle level, and a still further set representing the "last" or "market" quotations is shown on the lowest level.

Cooperating with the segments of each rotary switch is a rotary brush or wiper 118 which may be attached to or take the place of the indicating drums 39 of the quotation registers. The principal difference between the master quotation board and any of the secondary quotation boards lies in the presence of such switches in the master and the absence of the same in the secondaries.

In Fig. 7 that group of keys 1 to the left of the broken line a—a represents tens figures. The group of keys 2 between the broken lines a—a and b—b represents units figures and the group of keys 3 to the right of the line b—b may represent decimals or fractions. Each key actuates a plurality of contact springs, of which 101 is connected to an appropriate relay 247 shown in Fig. 9. The actuation of any key 1 closes a live contact 102 against contact 101 to energize a particular one of the relays 247 in the network system indicated generally by the broken line rectangle D. Contact 103 is connected individually to a particular rotary switch segment 122, whereby a test circuit is partially established for comparison purposes, the current being drawn from the positive pole of the battery A through the relay 7 and thence to the conductor 119 which feeds all of the contact springs 104 connected in parallel. As will later be seen, the establishment of this test circuit is intended to actuate relay 7 when both the tens and units figures of a new quotation agree respectively with the tens and units figures of the market quotation as previously registered.

The contact springs 106 are normally held in contact with and sandwiched between the contact springs 105 and 107 respectively. Contact springs 107 of the "0"-key connects with contact spring 105 of the "1"-key. Similarly each contact spring 107 of any key connects with contact spring 105 of the adjacent key of the next higher numeral. However, the contact spring 105a of the "0"-key connects with the positive pole of battery A while contact spring 107a of the "9"-key connects with the negative pole of battery C.

The contact springs 104, 105 and 106 of the respective tens-keys 1 may be considered links in a conductive chain placed in series between the positive pole of battery A and the negative pole of battery C. They are not supposed, however, to short-circuit these two batteries because normally there will always be two broken links where a key is depressed. To guard against an accidental short-circuit condition a suitable circuit breaker or current-limiting-resistance (not shown) may, of course, be introduced on either side of the battery.

The particular key 1 which is depressed, and hence the point where the positive and negative potentials are separated, determines what if any test circuits shall be established through the rotary switches representing the previous "high" and "low" registrations of a selected stock indicator. If the new quotation represents a new "high" it will later be shown that relay 10 will be actuated, and that if it represents a new "low" the relay 11 will be actuated for the purpose of transmitting a suitable code signal, in response to which, one or another of the extreme quotation indicators will be actuated. The contact springs of the units keys and the fractions keys are arranged in the same manner as those of the tens keys; hence a description of the circuits included in one of these groups will serve to explain the circuits belonging to the other two of the groups.

For the sake of simplicity only four keys of the tens group have been shown in Fig. 7, whereas it would of course be necessary to employ ten such keys representing each of the numerals "0" to "9" inclusive.

In Fig. 1 all of the keys of the keyboard 4 are shown in appropriate arrangement, so that it may be understood how any quotation having two digits and a fraction may be set up. These keys are preferably adapted to be locked in their depressed position and among the keys of one denomination the depression of any key automatically unlocks the one previously depressed, in a manner which is well known in the adding machine art.

The conductors connecting between the several contact springs 101, 103 and 117 and their respective relays (see Fig. 9) of the network D are shown to be included in the multi-conductor cable 120. The cable 121 contains ten conductors each terminating at the transmitter end in one of the springs 103, and (at the master receiver end) connected in multiple to as many of the contact segments 122 of the rotary switches 17 as there are quotation indicator groups. There is provided a rotary switch 17 representing the tens digit of the "last" quotation for each stock indicator. The branching of the cable 121 is shown at 121a and it will be understood that the contact 103 of the zero key connects with each of the segments 122₀ of the respective rotary switches 17 in each stock indicator.

In like manner the cable 123 contains ten conductors each terminating at one end in the contacts 106 which are individual to the respective keys of the tens denomination. This cable 123 is connected in multiple with the contact segments 124 of the rotary switches associated with the "high" indicators and also with the contact segments 125 of the rotary switches appropriate to the "low" indicators. The conductors connecting between similar contact springs 109 of the keys 2 in the units-group and leading to the rotary switch segments 126 of the units denomination of the market indicators will be understood to be included in the cable 127 which branches to corresponding rotary switches 18 of each quotation indicator group. Cable 128 includes ten conductors between the contact springs 111 of the units keys and their appropriate segments 129 of the "high" units indicators, also segments 130 of the "low" units indicators.

With respect to the keys 3 of the fractions denomination, contact springs 114 are individually connected by conductors included in the cable 132 which branches to segments 133 of the market fractions indicators. Contacts 116 are likewise connected by conductors in the cable 134 to the segments 135 of the "high" fraction indicators and in parallel therewith to the segments 136 of the "low' fractions indicator.

For each stock indicator group there is provided a relay 239 having eight movable contact springs 21 to 28 inclusive and eight corresponding stationary contacts 20.

No circuit can be established through any of the rotary switches of the master receiving station except those of the group controlled by a particular connector relay 239 when the latter is selected and actuated. Such selection and actuation enables certain test circuits to be established through the keyboard 4, the rotary switches and the contact springs 21 to 28 inclusive of the selected relay 239, whereby one or more of the relays 7 to 16 inclusive may be actuated for the purpose of characterizing the signal to be transmitted over the line or for the purpose of suppressing the transmission of a signal as set up on the keyboard if no difference exists compared with respect to the next preceding signal of the same classification.

*The code transmitter for functional indicator control*

Referring to Figs. 1, 7 and 10, it will now be shown how certain relays are automatically controlled in the composition of that part of the quotation signal immediately following the abbreviation for the stock indicator group, and making use of the 11th to the 15th code signaling segments inclusive of the first distributor. The purpose of the relays 7 to 16 inclusive and of the five-unit signals thereby composed is to effect the proper selection of functional indicators to be actuated in any stock indicator group. Fig. 10 may be viewed as an elaboration of certain portions of Fig. 7.

It will be remembered that the relay 7 is energized upon selecting the stock to be quoted whenever the tens and units digits of a quotation as set up on the keyboard 4 agree with the corresponding digits of a quotation as next previously registered. The circuit for energizing this relay may be traced from the positive pole of battery A through contacts 155 of relay 74, contacts 156 of relay 93, conductor 76, relay 7, that one of the contacts 104 which cooperates with a selectively actuated key 1, rotary switch 17, contacts 28 and 20, of relay 239, rotary switch 18, contact 109 of the particular key 2 which has been depressed, and thence to ground. It will be seen that there must be agreement between the previous setting and the new setting of the tens and units digits of the quotation in order that the circuit just traced may be completed, otherwise the depression of key 1 would feed current to a different segment 122 than that on which the wiper 118 would at the time rest; or the circuit could not be completed as between an active segment of the switch 18 and the corresponding contact 109 of the depressed units key 2.

Assuming now that the signal to be transmitted represents tens or units digits different from those which were previously registered, relay 7 will remain in its unenergized position thereby permitting current to be fed from battery B through conductor 250, movable contact spring 77 of relay 7, contact points 78 cooperating therewith, and segments 79 of the first distributor switch, whereupon two marking impulses are prepared for transmission as the first part of the functional code signal. Furthermore, current is fed to the conductor 157 by contacts 77 and 81, so that other portions of the functional code signal may be determined by any of the relays 9, 10 and 11.

The relay 8 is connected with certain test circuits which may be established through a selected rotary switch 19 corresponding with the fractions dial of any last-quotation indicator. The function of this relay is to suppress the transmission of any signal which would amount to a repetition of the next preceding quotation of a given stock. While relay 8 may be energized merely upon the selection of a fraction key 3 corresponding with the position of the wiper 82 on the rotary switch 19, such energization will not be effective unless it is also coincident with the energization of relay 7. In other words, relays 7 and 8 must be operated concurrently in order to suppress the transmission of the signal. The suppression of the signal and restoration of the starting key 38 takes place, therefore, when all of the dials of the last-quotation indicator are in agreement with the set-up of the keys 1, 2 and 3 on the keyboard 4.

The circuit for relay 8 may be traced from the positive pole of battery A, as previously described for relay 7, as far as conductor 76, then branching through conductor 158 to relay 8, thence to a contact 113 of the depressed key 3, one of the conductors in cable 132 which connects with a segment 133 of rotary switch 19, the wiper 82 thereof, contacts 20 and 27 of relay 239, and thence to ground. If relays 7 and 8 are both energized simultaneously it will be seen that instead of feeding current from the positive pole of battery B to the segments of the transmitting distributor and thence to the line, this current will be switched through conductor 83 to relay 12 (see Fig. 9) which when operated lights a pilot lamp 284 thereby giving a visible signal to the operator that his set-up of the quotation is the same as that previously registered, for which reason it will not be transmitted. Furthermore, the operation of relay 12 results in releasing the starting key 38 and performs other functions in accordance with the foregoing description.

When there is correspondence only between the tens and units digits of a previous quotation and a quotation to be registered but there is still a new fractional indication to be registered, then relay 7 will be actuated for the purpose of curtailing the signal but relay 8 will remain in its normal position. In this case current from the positive pole to battery B will be conducted through contacts 77 and 84 of relay 7, contacts 85 and 86 of relay 8, thence to contacts 90 and 91 of relays 10 and 11, respectively. This circuit may or may not be completed depending upon whether one or the other of the relays 10, 11 is actuated. Relay 10 is controlled by the condition of the set-up on the keyboard of a "new high" quotation of any stock. Relay 11 is controlled in a similar manner when a "new low" quotation is set up on the keyboard 4.

Relay 9 is actuated only when an opening price for any particular stock is to be transmitted. At that time the dials of the stock indicator in question will have been set to their blank position, and hence the segment 133o of switch 19 on which the wiper 82 rests will provide a closed circuit for energizing the relay 9 which may be traced from the positive pole of battery A, as previously indicated in connection with the above described circuit for operating relay 7, but branching from conductor 76 through the conductor 158 to relay 9, thence to segment 133o of the selected switch 19, wiper 82, contacts 26 and 27 of relay 239 and thence to ground. After the opening price has been set up for any particular stock the relay 9 cannot again be actuated with respect to quotations of that stock unless and until the indicators have been restored to the "blank" position by means of the clearing signal. In case for any reason an eroneous transmission of a high or low quotation appears, this system provides for clearing the "opening," "high," "low" and "last" indicators simultaneously, then setting all these indicators a second time to the opening price, followed by the transmission of the correct "high" and "low" prices and finally the transmission of the "last" price up to that moment.

It will be remembered that the relays 10 and 11 are caused to control the transmission of suitable signals for the indication of new "high" and new "low" quotations, respectively. The movable contacts 90 and 91 of these relays are fed with current from the battery B when an abridged signal is to be transmitted representing the fraction only; that is, when relay 7 is operated. On the other hand, movable contacts 87 and 89 are fed with current from the battery B when the unabridged signal for a quotation is to be transmitted; that is, when relay 7 is not operated.

The composition of the functional indicator signal depends, therefore, upon whether or not relay 7 is operated. When operated the signal will be combined with the fraction signal, or in other words the segments 79 of the first line distributor switch will be used for "high" and "low" indications while the fraction signal will be set up on segments 265. In this case the second distributor switch will not be operated. When relay 7 is not operated, that is, for the transmission of an unabridged signal, the functional indicator signal will be spread over both of the segments 79 and a selection of segments 265, whereupon the second line distributor switch will be called into action.

Considering first the conditions under which a new "high" quotation is to be transmitted and in which the relay 10 will be energized, it will be seen that if the unabridged signal is to be sent representing the tens, units and fractions denominations, then the functional indicator signal will be prepared by feeding current to both of the segments 79 from battery B through contacts 77 and 78 of relay 7. Furthermore, current will be fed through contacts 77 and 81 of relay 7, conductor 157, and contact 87 of relay 10 to the third and last of the segments 265, viewing the latter in order of clockwise rotation. This circuit can easily be traced on Fig. 10 and it will be seen that the transmittal of a five unit code signal representing two marking impulses, two spacing impulses and a marking impulse, is in accordance with the signal for a new high quotation as shown in Fig. 2.

When relay 7 has been actuated for the purpose of sending an abbreviated signal and when the new "high" quotation represents merely a fractional change, then current will be fed from battery B to contacts 77 and 84 of relay 7, contacts 85 and 86 of relay 8, movable contact 90 of relay 10 and its associated front contact which is connected to the second of the segments 79 in order of clockwise rotation. The result, therefore, is to compose a two-unit signal upon the segments 79, the first of which is a spacing unit and the second of which is a marking unit. So far as the functioning of relay 10 is concerned, segments 265 are no longer necessary for functional indication but are rendered available for the composition of a fraction signal, being connected to the contacts controlled by relays 253 through the contacts 266 of relay 7 (see Fig. 9).

Considering now the requirements for functional indicator control on the occasion of transmittal of a new "low" quotation, relay 11 will co-operate with relay 7 in the same manner as has been described with respect to the co-operation between relay 10 and relay 7. For the unabridged transmittal of a new "low" quotation, current will be fed by relays 7 and 11 through back contacts 78 of relay 7 and thence directly to segments 79; also through back contact 81 of relay 7, conductor 157, movable contact 89 of relay 11 and its associated front contact which is in circuit with the middle one of the segments 265. Thus a signal is composed which is characterized by two marking units, a spacing unit, a marking unit and a spacing unit. This is also in accordance with the signal for a new "low" quotation as shown in Fig. 2. If relays 7 and 11 are both actuated simultaneously, then the new "low" signal is represented by a marking impulse on the first of the segments 79, the circuit for which may easily be traced from contact 91 and its associated front contact, both of relay 11. This signal also renders the segments 265 available for the transmission of a fraction signal.

The proper control of relay 10 will now be considered. Various relationships will naturally occur between the set-up on the keyboard 4 and the existing settings of rotary switches 144, 145 and 146, representing the previous "high" quotation for the selected stock. By virtue of the simple relationship between the setting of a key 1 and the position of the wiper 164 on the rotary switch 144 (the tens denomination), either positive, negative or zero potential may be impressed upon the wiper 164. If the tens figure to be transmitted is higher than was previously quoted the potential upon the wiper 164 will be positive. The circuit may be traced from the positive pole of battery A through key contact springs 105, 106 and 107 of all the keys 1 of lower order than the depressed key 1 and through that particular conductor of cable 123 which feeds the segment 124 upon which the wiper 164 happens to rest. Under the conditions stipulated, therefore, positive potential will be conducted from wiper 164, contacts 20 and 21 of relay 239, unidirectional device 170, and thence to relay 10 which is grounded at the other end of its coil. If the tens figure of the new "high" quotation agrees with the tens figure of the previous "high" the actuation of relay 10 will not be governed by this relationship but by a relation between either the unit digits or the fractions of the quotations under comparison. In accordance with a second relationship, that is, where agreement exists between the setting of the tens key 1 and the previously established position of the wiper 164 on the segment 124, no current is fed through said wiper 164 to the relay 10 because of the separation by the depressed key 1 of its contact springs 105, 106 and 107.

In accordance with a third relationship between the setting of a key 1 and the previously established position of wiper 164, that is, when the new quotation has dropped below the setting of the previous "high," negative potential will be fed from the negative pole of battery C through successive sets of contact springs 105, 106 and 107, until it reaches a conductor in cable 123 corresponding with the active segment 124. As soon as the wiper 164 is thus negatively polarized, the grounded relay 13 will be actuated through the circuit which includes the unidirectional device 171 connecting with contacts 21 and 20 of relay 239, the latter of which connects with the wiper 164. The operation of relay 13 is for the purpose of preventing any possible control of relay 10 that might occur due to the existence of certain irrelevant relationships between the key setting in the units and fractions denominations and corresponding positions of the wipers 165 and 166 respectively of the units and fractions rotary switches 145, 146. By actuating relay 13 any positive potential which might be conducted through rotary switches 145 or 146 is arrested at the opening of the branch circuit therefor through the contact springs 172 of relay 13. It will be seen therefore that under this third relationship the transmittal of a tens figure lower than any which was previously transmitted for a given quotation cuts off the possibility of relay 10 being actuated by a units- or fractions-relationship and so prevents the improper composition of a "high" signal as when the circuits therefor might otherwise be established.

Assuming now that the tens figure of the new "high" quotation is unchanged from that of the previous "high," the situation will be dominated by the relationship existing between the units key 2 and the previous setting of the wiper 165 of the units rotary switch 145. Here again positive potential may be conducted from the positive side of battery A through contacts 111 and 112, until that conductor in cable 128 is reached which connects through a segment 129 with wiper 165. Wiper 165 also connects through contacts 20 and 22 of relay 239, through the unidirectional device 173, contacts 172 of relay 13, relay 10 and thence to ground. This circuit may be established, therefore, irrespective of the possibility of simultaneously actuating the relay 10 by virtue of the dominating relationship of the tens figures of the quotations. In other words, if the tens and units figures set up on the keyboard are both higher than those of the "highs" previously registered, positive current will be fed through the wipers 164 and 165 in parallel but if the situation is dominated only by the units figure relationship then the circuit just now traced through wiper 165 will actuate the relay 10 with equal facility.

The units key setting and the position of the wiper 165 may at times be in correspondence, in which case no current will reach the relay 10 through said wiper 165. In case of a simultaneous correspondence between the tens key 1 and the wiper 164 the actuation of relay 10 will depend upon the relationship existing in the fractions denomination. If, however, the actuation of relay 10 is to be prevented solely by a drop in the units denomination (the tens figure remaining the same as previously), then negative potential will be fed through a circuit which may be traced (in the reverse direction from the current flow) from the negative side of battery C through contacts 111 and 112 of keys 2 until that conductor in cable 128 is reached which terminates in a segment 129 then in contact with the wiper 165. This circuit may be further traced through contacts 20 and 22 of relay 239, the unidirectional device 174 and relay 14 which is grounded. Relay 14 opens that branch of the control circuit for relay 10 which responds to a set-up of a new high quotation of fractional change only. It will be remembered that relay 13 is actuated when the tens figures of a new quotation falls below the tens figure of a previous high. So, likewise, relay 14 is actuated when a units figure of a new quotation falls below a previously registered units figure of a high quotation.

The effect, then, of actuating the relays 13 and 14 is to prevent the actuation of relay 10 under circumstances when a digital relationship considered per se would otherwise permit, but which would obviously be improper, considering the digits and fractions in their entirety. For example, after registering a high of 23½ for any stock, a subsequent quotation of that stock at 19¾ requires the actuation of relay 13, due to the drop in the tens figure, in order that the positive potential reaching wipers 165 and 166 by virtue of the units and fractions relationship (3 vs. 9 and ½ vs. ¾) shall not be effective. Similarly, a subsequent quotation of 22¾ requires that relay 14 be actuated for the same purpose, namely, to prevent control of relay 10 by the relationship ½ vs. ¾.

Assume now that both the tens and units figures of a new quotation are in agreement with corresponding figures of a previously registered "high" then the relay 10 may be actuated whenever a new fraction appears which is higher than that of the previously registered high. The control circuit may at this time be traced from the positive pole of battery A through contact springs 115 and 116 of keys 3 until that conductor in cable 134 is reached which terminates in a segment 135 upon which the wiper 166 happens to rest; thence through contacts 20 and 23 of relay 239, unidirectional device 175, contacts 176 of relay 16, contacts 172 of relay 13, relay 10 and thence to ground. If the fraction of the new quotation falls below the fraction of the previously registered high and the situation is still dominated by the fractions relationship between the key setting and the wiper 166, then this wiper will be negatively polarized by battery C and the flow of current through the relay 10 will be prevented by the unidirectional device 175. It will be seen that in case of a repetition of set-up on the keys 1, 2 and 3 of a previously registered high, all of the circuits as above described through the wipers 164, 165 and 166 will be broken due to the opening thereof at the contact 106 of the depressed key 1, contact 111 of the depressed key 2, and contact 116 of the depressed key 3. In this case, therefore, there will be no repeated selection of the high indicator and the previously registered quotation will remain standing for the stock that is quoted.

The foregoing description of the test circuits shown in Fig. 7 and the relationships that must be provided for, as between the key set-up and the existing positions of the wipers 164, 165 and 166 respectively, is directed particularly to the control of relay 10 by the system comprising relays 13 and 14 and their co-operating unidirectional devices 170, 171, 173, 174 and 175. This system is indicated generally (see Figs. 7 and 10) by the broken-line rectangle E. A similar system is provided for the control of relay 11 in the determination of functional indicator selection for new "low" quotations. This latter system includes relays 15 and 16 together with five unidirectional devices 177. This last mentioned system will be seen to cooperate with the wipers 167, 168 and 169 of the rotary switches 147, 148 and 149 respectively, all of which have to do with the registration of minimum quotations. It will be noted particularly that the segments 124 and 125 of the maximum and minimum rotary switches respectively are connected in parallel arrangement on a single system of conductors at the other end of which are the contact springs 106 of the keys 1. It follows that corresponding segments 124 and 125 will be correspondingly polarized but that due to a variance in the positions of the wipers 164 and 167 these wipers may be either correspondingly or oppositely polarized or there may be no potential on either or both. A similar parallel arrangement exists as between the segments 129 and 130 which connect with the conductors of cable 128 and as between segments 135 and 136 which connect with the conductors of cable 134. The maximum quotation relationships, however, are suitably tested by the circuits established through the unidirectional devices comprehended in the system E; while the minimum relationships are oppositely tested when the circuits therefor are branched through the reversed arrangement of unidirectional devices 177.

A careful study of the connections between the keyboard and the batteries A and C will reveal that the direction of current flow is utilized to establish proper control of relays 10 and 11 under all possible relationships between previous registrations of "highs" or "lows" and the keyboard set-up of a quotation to be transmitted. In view of the foregoing description, therefore, it is unnecessary to trace in detail the circuits for the control of the relays 15, 16 and 11 which serve to set up the signal at the proper time or to prevent such set-up when necessary in connection with the transmission of minimum quotations.

All of the relationships of the maximum or minimum test circuits as shown in Figs. 7 and 10 may be summarized in the following tabulation which assumes as illustrative cases the transmission of any one of twenty-seven different quotations immediately following an "opening" quotation of 23½. It will be remembered that in transmitting an "opening" quotation the four indicators for "opening," "high," "low" and "last" prices are simultaneously and similarly actuated. From that time on the haphazard fluctuation of prices of a given stock necessitates an ever-widening range between new "highs" and new "lows." This tabulation shows the effect of setting up such quotations, including the polarization of the wipers 164 to 169 inclusive, and the resulting response of the relays 10, 11, 13, 14, 15 and 16. The quotations listed first and above 23½ are obviously new maxima and call for the actuation of relay 10. The repetition of the quotation 23½ is ineffective in actuating any of the relays under consideration. Furthermore, the quotation itself would be suppressed if it immediately followed the opening price 23½. The remainder of the tabulated list includes only new minima and for such the actuation of relay 11 is called for. Relays 13 and 15 are under control of the tens-digit relationship while relays 14 and 16 are under control of the units-digit relationship. The prevention of control by a relationship of lower order is thereby effected when necessary.

| Illustrative quotations | Polarization of wipers | | | Relays actuated | | | | | |
|---|---|---|---|---|---|---|---|---|---|
| | 164 and 167 | 165 and 168 | 166 and 169 | | | | | New high | New low |
| 34¾ | + | + | + | --- | --- | 10 | 15 | 16 | --- |
| 34½ | + | + | 0 | --- | --- | 10 | 15 | 16 | --- |
| 34¼ | + | + | − | --- | --- | 10 | 15 | 16 | --- |
| 33¾ | + | 0 | + | --- | --- | 10 | 15 | --- | --- |
| 33½ | + | 0 | 0 | --- | --- | 10 | 15 | --- | --- |
| 33¼ | + | 0 | − | --- | --- | 10 | 15 | --- | --- |
| 32¾ | + | − | + | --- | 14 | 10 | 15 | --- | --- |
| 32½ | + | − | 0 | --- | 14 | 10 | 15 | --- | --- |
| 32¼ | + | − | − | --- | 14 | 10 | 15 | --- | --- |
| 24¾ | 0 | + | + | --- | --- | 10 | --- | 16 | --- |
| 24½ | 0 | + | 0 | --- | --- | 10 | --- | 16 | --- |
| 24¼ | 0 | + | − | --- | --- | 10 | --- | 16 | --- |
| 23¾ | 0 | 0 | + | --- | --- | 10 | --- | --- | --- |
| Opening 23½ | 0 | 0 | 0 | | | | | | |
| 23¼ | 0 | 0 | − | --- | --- | --- | --- | --- | 11 |
| 22¾ | 0 | − | + | --- | 14 | --- | --- | --- | 11 |
| 22½ | 0 | − | 0 | --- | 14 | --- | --- | --- | 11 |
| 22¼ | 0 | − | − | --- | 14 | --- | --- | --- | 11 |
| 14¾ | − | + | + | 13 | --- | --- | --- | 16 | 11 |
| 14½ | − | + | 0 | 13 | --- | --- | --- | 16 | 11 |
| 14¼ | − | + | − | 13 | --- | --- | --- | 16 | 11 |
| 13¾ | − | 0 | + | 13 | --- | --- | --- | --- | 11 |
| 13½ | − | 0 | 0 | 13 | --- | --- | --- | --- | 11 |
| 13¼ | − | 0 | − | 13 | --- | --- | --- | --- | 11 |
| 12¾ | − | − | + | 13 | 14 | --- | --- | --- | 11 |
| 12½ | − | − | 0 | 13 | 14 | --- | --- | --- | 11 |
| 12¼ | − | − | − | 13 | 14 | --- | --- | --- | 11 |

At the top of Fig. 10 are shown three special keys of the keyboard 4 whereby certain functional indicator signals may be manually initiated. Key 182 serves to actuate relay 74 whereby positive potential is impressed upon both of the segments 79 and upon the three segments 265. This transmits the functional indicator signal for setting the "previous close" indicator with its hundreds-digit target 93 suitably positioned to indicate any quotation of one hundred or above. Relay 74 when actuated causes its armature 185 to make contact with three front contacts each of which is connected with one of the segments 265. The connections from the positive pole of battery B are clearly shown. Relay 74 also opens the circuit which includes its contacts 155 so that no current from the positive pole of battery A can reach the conductor 76 and hence no existing condition of the test circuits can be effective to improperly actuate relays 7, 8 and 9. Since relay 7 remains in its normal position the two segments 79 are fed with current from battery B through the contact springs 77 and 78.

Key 183, when depressed, actuates relay 93, whose contact springs 186 close circuits similar to those closed by relay 74 with the exception that no potential is placed upon the third and last of the segments 265. The breaking of the battery B connection to conductor 76 is effected at the opening of contacts 156 so that none of the relays 7, 8 nor 9 can be actuated. Thus a signal is prepared for transmission representing four marking units and one spacing unit. This signal, as will be seen from Fig. 2, controls the "previous close" indicator together with its target 93, the latter being thrown into position to indicate a blank in the position of the hundreds digit as when the quotation is below 100.

Key 184, when depressed, actuates relay 152 the armature 153 of which closes circuits from the positive pole of battery B to the last two segments 265, as well as to both of the segments 79. The five unit signal thus composed comprehends sequentially two marking units, a spacing unit and two marking units. The effect of the signal is to "clear" all of the indicators for a selected stock except the "previous close." Relay 7 is also actuated by the grounding of its coil through the armature 159 of relay 152, positive potential from battery A being normally impressed upon the opposite side of said coil through contacts 155 and 156 of relays 74 and 93 respectively and thence through conductor 76. The object of actuating relay 7 is to effect the transmittal of an abbreviated signal, it being unnecessary on this occasion to call the second distributor switch into action.

The actuation of the release relay 277 through a circuit which includes contact 275 of relay 7 (see Fig. 9) has already been explained and it will be understood here that relay 277 restores all conditions to normal upon completion of the single revolution of the first distributor switch when transmitting the "clear" signal.

The keys 182, 183 and 184 may be provided, as are keys 1, 2 and 3, with latch mechanisms whereby they are automatically held in a depressed position until released by the depression of some different key, as is well known in the adding machine art. In the absence of such mechanical arrangement for latching these three keys, locking circuits may obviously be included for the relays 74, 93 and 152 whereby they are kept energized until the completion of the signaling cycle.

Referring to the restoring magnet 220 shown in Fig. 8 and the release magnet 277 shown in Fig. 9, the cooperation therebetween should now be mentioned. Since the coil of magnet 220 is at all times connected on one side to battery B, it will be seen that the other side of this coil needs only to be grounded by the closure of contacts 150, one of which is mounted on the armature 272 of relay 277, and the two magnets may then be energized almost simultaneously. If desired the circuits may be so arranged as to place these magnets in series, or a single coil may be provided the function of which is to perform all of the services of the two magnets 220 and 277 conjointly. The object to be attained in any event is the restoration of all relays and setting mechanisms of the transmitter to their normal positions upon completion of the transmittal of any signal or upon setting up on the keyboard 4 of a signal which does not need to be transmitted.

*Receiving relay network for abbreviations*

Fig. 11 shows in the upper left hand corner a line relay 301 which may be polarized so that positive line potential draws the armature to the left and negative potential to the right. Alternatively, where "marking units" correspond with current impulses in the line and "spacing units" correspond with no current in the line, a simple relay may be provided with its armature biased by a spring 312 against which the line impulses must act. Then with current normally flowing in the line the armature 303 is held away from its contact 302. It is common practice in the telegraph art to maintain a closed circuit condition on the line, when no signals are being transmitted. This is particularly true in the operation of start-stop mechanisms where it is desired to effect a starting movement of a distributor switch upon opening the line circuit. In the present embodiment of my invention it is preferable to adopt the same practice. Fig. 11 will be understood to show the operation of relay circuits in conformity with this practice.

The code signals are thus preceded in all cases by a negative impulse or by a moment of cessation of current flow in the line. During this moment armature 303 is swung against its contact 302 thereby closing a circuit from battery F through contacts 304 and 305 of relay 306 to the brush arm 307 of the first distributor switch in the receiving network. The brush arm 307, in its starting position rests upon segment 308 which is connected to the release magnet 309, the other end of the coil of which is grounded. The brush arm 307 of this distributor switch will be understood to be motor driven in any well-known manner, a suitable clutch (not shown) being provided for engagement and disengagement thereof in accordance with the control of release magnet 309. When the brush arm 307 sweeps off of the segment 308, the circuit for the release magnet 309 will be opened and its armature will drop back to normal position in readiness to arrest the brush after making one revolution. The speed of rotation of the brush will be understood to be suitably adjusted to pick up code signals in accordance with the speed of transmission.

The armature 303 of the line relay is connected to battery F, and the contact 302 during the rotation of the first distributor is in circuit with the brush 307. In accordance with the diagram of Fig. 11, therefore, the spacing units of the signals correspond with impressions of battery potential upon the distributor segments, while no current is fed to segments to which marking units are allocated.

All of the relays which are directly actuated by circuits through the segments of the receiving distributor switches are provided with locking circuits whereby when energized they remain energized until the mechanical operation of setting the quotation indicators has been completed. The opening of such locking circuits to release all of the selector relays simultaneously is diagrammatically indicated by the contacts 310, one of which is controlled by a cam 311 mounted on the shaft 55 of the motor driven setting mechanism (see Fig. 5). It will be recalled that the setting movement for rotating the drum dials 39 is accomplished in the first half revolution of the shaft 55. The relay circuits may therefore be broken upon completion of this half revolution so that all of the selector relays may be restored to normal positions before the commencement of a succeeding signal.

As has been heretofore explained, the code signal for an abbreviation is equivalent to two five-unit signals each of which may represent a single letter or an arbitrary combination of letters where the usual abbreviation for a stock may consist of more than two letters. Any five-unit signal, however, having a two-letter significance at the transmitter will at the receiving end be considered merely from the standpoint of its selectivity. The observer of the quotation board having no knowledge of the circuit connections for the receiving relay network does not have to be satisfied by a retranslation of the arbitrary code signals into an intelligibly readable form. The requirements of the abbreviation selector network are satisfied when it accomplishes the proper selection of quotation indicators to be actuated.

The three segments 313 of the first distributor switch lead each to one of the relays 314. The two segments 315 are likewise connected to relays 316. Relays 314 when operated in different combinations effect the selection of any one of eight circuits 317. Relays 316 when operated in different combinations effect the selection of any one of four circuits 318. Circuits 317 are fed with current from battery F at the moment of operating relay 319, that is when the brush 307 contacts with segment 320. At this moment, current is fed from the battery through the line relay armature 303 to segment 320 because an idle time unit is interjected at that part of the cycle between the abbreviation-code signal and the functional indicator selecting signal. Segment 320, therefore, always represents a spacing unit to which relay 319 responds by locking itself in operative position through its own armature 321 and associated front contact which is connected to the live conductor 322. Conductor 322 also feeds front contacts which are associated with the armatures of each of the relays 314 and 316 respectively so that these relays are locked whenever selected by spacing units of the code signals.

Due to the fact that the relays 314 and 316 are controlled successively and in the order in which the segments of the first distributor are reached by the brush 307, these relays are first energized and locked in position before the selector circuits which they control are fed with current from battery F through the armature 321 of relay 319.

Eight of the selector relays 323 which are controlled by the cooperation of selector relays 314 and 316 are shown in Fig. 11. I may, if desired, employ a total of thirty-two such relays 323, twenty-four of which will be understood to be comprehended within the rectangle G. Each relay 323 may be individually selected by selection of one of the circuits 317 in combination with the selection of one of the circuits 318. With the possible permutations of operation of relays 314 and 316 it is therefore possible to select any one of thirty-two relays 323.

In order that there may be no feed-back of current from battery F through non-selected circuits 317, and through relays 323 which are not intended to be selected, the unidirectional devices 324 are provided each in series with one of the relays 323.

So long as the locking relay 319 remains energized, current will be fed through one of the circuits 317 to a selected relay 323, thence through a circuit 318 to ground at 325. It is not necessary, therefore, to provide individually self-locking circuits for the relays 323.

The segments 326 of the first distributor are connected to three relays of group H in a manner similar to that shown with respect to the relays 314. Segments 327 also feed a pair of relays comprised in the group J, which corresponds to the system of relays 316.

The network of secondary circuits controlled by relays 314 and 316 is duplicated in groups H and J and is made effective in selecting relays 328, of which there may be as many as thirty-two. Unidirectional devices 324 are also provided, one in series with each of the relays 328 so that there may be no improper feed-back of current through non-selected relays of this group.

Viewing the abbreviation-selector system as a whole, the code signal for the first letter of an abbreviation may be set up on the segments 313 and 315 while the code signal for the second letter of an abbreviation may be set up on the segments 326 and 327. With such a two-letter selection one of the relays 323 will be actuated as well as one of the relays 328. Conductors 329 represent individual input circuits for the contact springs 330 which are actuated in groups by the relays 328. Considering any group of springs 330 which are jointly controlled by a single relay 328 it will be understood that each such spring receives current by closure of a different relay 323. Any conductor 329, may, however, be branched to a plurality of springs 330, each belonging to a different relay 328. The cable 331 will be understood to comprise all of the conductors 329 each under the control of one of the selector relays 323 as shown or as comprised in group G.

It will now be seen that the cooperation of relays controlled by segments 313 and 315 representing the first letter of an abbreviation with relays controlled by segments 326 and 327 representing the second letter of an abbreviation provides the possibility of selecting any one of a large number of circuits through contact springs 330 each of which feeds current to a control magnet 45h for a single stock indicator group. Conductor 332' shows one such connection. The numerous conductors connected between contacts of relays 328 (Fig. 11) and the jacks 375 (Fig. 12) may be cabled if desired, as shown at 332 (Fig. 12). One terminal of the coil of magnet 45h is grounded; hence the selection of any stock indicator group may be effected by the selective operation of the relay system as shown.

*Receiving relay network for functional indicator selection*

The five segments 333 and 334 of the first distributor switch are in position to receive the signal for functional indicator selection following the reception of the code signals for stock indicator group selection. Segments 333 are individually connected to and control relays 335 whereby any one of four circuits 336 are selected and grounded. Segments 334 are likewise individually connected to and control relays 337 whereby any one of eight circuits 338 are selected and fed with current from battery F through conductors 322 and 339, but only after such circuit is established by the operation of relay 340, which takes place when the brush 307 reaches segment 341 of the distributor switch. Relay 340 locks itself when actuated, the locking circuit passing through its own armature 342.

Theoretically the relays 335 and 337 may be selected in any one of thirty-two different permutations. It is preferable, however, to use about six of these permutations for functional indicator selection. Segments 333 may, however, be used singly for high and low indicator selections when an abbreviated quotation signal is being received and when segments 334 have assigned to them a signal representing a fraction only of a quotation.

Fig. 11 shows six relays 343 each of which may be operated for a functional indicator selection.

Fig. 12 shows the secondary circuits of these relays and how they are connected through the bus wires 344 and the switch contacts 345 of the individual indicator control magnets 45h to any of the functional indicator selector magnets 45, 45c, 45g, 45f and 45h; 45 being in series with selector magnets 75a and 75b whereby the hundreds digit target 112 of the "previous close" indicator is controlled.

Referring again to Fig. 11, the purpose of the functional indicator selecting relays 343 acting through the cooperation of selector relays 335 and 337 will now be explained. Relays 343 are shown in the diagram in a vertical column and are individually lettered (reading downwardly of the column) a, b, c, e, f and g. Relay 343a selects a "previous close" indicator by energizing magnet 45 together with the target setting magnet 75a. Relay 343b makes a similar selection of magnet 45 together with the target setting magnet 75b. The "opening" price indicator controlled by the magnet 45c is selected by the operation of relay 343c. This last named relay also closes circuits which actuate magnets 45g and 45f for setting the "high" and "low" indicators, respectively, and simultaneously with the "opening" price indicator. Relay 343e is actuated by the "clear" signal and closes circuits for energizing all of the magnets 45c, 45g and 45f. Still another circuit is simultaneously closed which energizes magnet 99 (see Fig. 12) whereby the pins 64 and 60a are suitably positioned to control a setting movement for rotating the drums of these indicators and of the "last" price indicator simultaneously to the blank position.

Relays 343f and 343g have two coils because each may be actuated by either one or another of two functional signals according as an unabbreviated or an abbreviated signal is received. The selection of the "low" price indicator is effected through the energization of magnet 45f upon selection of relay 343f. The high indicator is selected under the control of magnet 45g, which is energized when relay 343g operates.

The control of the relays 343 upon reception of any of the functional indicator signals may be understood by tracing those of the circuits 338 established by relays 337 that connect through the unidirectional devices 324 to the left hand terminals of the coils of relays 343. The conductors 338 leading from the front and back contacts of relay 337j are lettered a to h inclusive in conformity with the lettering of relays 343, for ease of identification of the last named relays with the code combinations set up by relays 337. Thus, for example, when marking units are received upon each of the segments 334, none of the relays 337 will be energized but upon closing the circuit from battery F through conductor 339 current will be fed to conductor 338a and thence to relay 343a. Continuing the tracing of this circuit through conductor 346 it will be seen that relay 306 is in series with relay 343a and this circuit is completed through conductor 347, resistance 348 and back contacts (shown furthest to the right) of relays 335 to ground. The circuit just traced presumes that marking units were impressed upon segments 333, whereupon neither of the relays 335 would be actuated.

The actuation of relay 306 has just been mentioned as taking place simultaneously with the energization of relay 343a. The effect of energizing relay 306 is to transfer the reception of succeeding signals to the second distributor switch. This is what happens whenever any of the relays 343a, 343b, 343c, 343f or 343g are selected under the control of relays 337 in co-operation with relays 335, provided neither of the relays 335 are actuated. In other words, the actuation of relay 306 takes place whenever the reception of the unabridged signal is required, as signified by the particular functional signals to which relays 343a, 343b, 343c, 343f and 343g are rendered responsive.

The selection of relays 343b or 343c in combination with relay 306 will be understood by tracing the circuits therefor which are analogous to the circuit described for relay 343a. Furthermore, it will be seen that the circuits which include either the left hand coil of relay 343f or the left hand coil of relay 343g are likewise analogous to the circuit already traced for relay 343a.

Relay 343e is actuated upon reception of the "clear" signal, which does not call for the use of the second distributor switch. So instead of connecting the windings of relay 343e and of relay 306 in series, the return circuit 349 for relay 343e includes a special winding on the starting magnet 96 and is conducted thence through resistance 348 and contacts of relays 335 to ground. By this arrangement (as will later be described) the clearing of the indicators for "opening," "high," "low" and "last" quotations is effected immediately upon reception of the "clear" signal on the first distributor.

*Receiving relay network for fractions-dial control*

The reception of signals for the control of the setting mechanism which pertains to the fractions dials will now be explained. Such signals may be received upon either the first or the second line distributor. When received upon the segments 334 of the first distributor, relays 337 are set up in any one of eight combinations, whereby one of the circuits 338 is fed with current from battery F through conductor 339 the same as has already been described in reference to the reception of the full signal for functional indicator selection. Under the conditions now being considered, however, the circuits 338 are not closed through the coils of the functional indicator relays 343 which have already been discussed. This is due to the fact that when receiving an abridged signal, at least one of the segments 333 will have impressed thereon a spacing impulse. If spacing impulses are received on both of the segments 333, then relays 335 will both be actuated, whereupon the particular circuit 336 which includes resistance 350 will be grounded. This permits any one of the circuits 338 to be completed through the right hand winding of one of the magnets 351, continuing thence through the middle coil of the starting magnet 96 for the dial setting mechanism. The magnets 351 may, if desired, directly control the stop pins 60 of the fractions-dial setting mechanism. Alternatively, the magnets 351 may represent relays the secondary circuits of which would comprehend more powerful magnets for operating the stop pins 60.

If upon reception of an abridged signal a new "high" quotation occurs, then segments 333 will be impressed with spacing and marking units respectively in the order named and the lower one of the relays 335 will be energized. In this case the right hand coil of relay 343g is in series with the selected magnet 351, starting magnet 96 and the circuit 336 which is shown second from the right in the diagram. The flow of current through this circuit, therefore, completes the selection of a stop pin 60 and of the "high" magnet 45g and initiates a setting movement of the shaft 55.

Assuming that the fraction quoted is a new "low," then a marking unit will be impressed upon the first of the segments 333 and the upper of the two relays 335 will be energized. The circuit then established through one of the conductors 338 to a selected fractions-magnet 351 will be traced through starting magnet 96, the low-indicator selecting magnet 343f and the second from the left of the conductors 336 to ground.

It will thus be seen that the proper relays 343f or 343g may, when necessary, be included in series with the control magnets 351 which actuate the stop pins 60 of the fractions dial setting mechanism. One of the coils of the starting magnet 96 may also be included in series therewith for actuating the latter immediately after the brush 307 has made one revolution. It will also be noted that upon reception of the abbreviated signal no circuit is established through the relay 306, as when necessary to transfer further signals to the second line distributor. It is only when marking units are received upon both of the segments 333 that the second distributor is called into play, that is, when the setting mechanism is to be controlled which moves the tens and units as well as the fractions dials. If marking units on 333 are followed by spacing units on each of segments 334, then the second distributor will respond to the unabridged quotation signal merely to set the "last" quotation dials.

*The second distributor switch and its receiving network*

As has been explained, the second distributor switch shown in Fig. 11 is called into play after the first distributor switch brush 307 has made one excursion, provided the relay 306 is actuated. Brush 307 in passing over segment 341, a spacing impulse being always received at that moment, causes locking relays 340 to be actuated and a circuit is completed as previously traced through conductor 339, one of the functional indicator relays 343 (or resistance 344), relay 306, and thence through resistance 348 and contact springs of relay 335 to ground. This spacing impulse will be understood to be sufficiently prolonged so that it will be transferred through the armature 304 of relay 306, conductor 353, brush 354 of the second distributor, and thence to segment 355 and release magnet 356 which is grounded. The brush 354 will therefore be started on an excursion of one revolution over the segments of the second distributor. The first seven of these segments are shown in Fig. 11 to be directed into a network K, the details of which appear in Fig. 13.

Usually the code signal for the tens digit of a quotation will be set up on the three segments 357, while the code signal for the units digit will be set up on the two segments 358. An exceptional arrangement in conformity with the signaling code heretofore described (and shown in Fig. 2) is where the units digits "4" or "9" appear in the quotation, in which case the first and second of the segments 357 are both characterized by marking impulses indicative of the units digits "4" or "9", while the third of the segments 357 together with the segments 358 are made receptive of the signal for the tens digit. The third of the segments 357 is not, however, disturbed by this interchange. In other words, the individual significance of the code units for the tens figure when impressed upon the third of the segments 357 and also upon the two segments 358 may be transposed into sequence 3, 1, 2 rather than in the normal sequence 1, 2, 3.

Segments 357 are connected to relays 359, each of which is equipped with a locking circuit so that, when energized, current continues to flow from battery F through conductor 322 to contacts 310 of the circuit breaking cam 311, conductor 322, and thence through the armatures of these relays and their own coils which are grounded. Relays 360 are connected to segments 358 and are likewise equipped with locking circuits the same as relays 359. The three relays 359 are provided with suitable moving contacts and stationary front and back contacts whereby any one of seven circuits may be selected according to the permutational arrangement of the relay selections. Relays 360 are also provided with contact springs which cooperate to effect any one of four selections. Twenty-five of the possible selections which may result from the combined actuation of selected relays 359 and 360 are utilized for the second stage of selection of the tens and units digits of the quotation, the first stage being considered the selection of the relays 359 and 360 themselves. It is possible, therefore, by this arrangement to utilize the five-unit code to which segments 357 and 358 are made receptive for the purpose of energizing any one of the twenty-five relays 361. In series with each of these relays is a unidirectional device 324 which is provided so that the secondary circuits of relays 359 may each lead to a plurality of relays 361, while the secondary circuits of relays 360 may each lead to a differently grouped plurality of relays 361. No feed-back of current through non-selected relays 361 is possible where individual unidirectional devices are provided for each relay in the manner shown.

The system of relays 361 is shown in Fig. 13 in co-ordinate arrangement where the numerical significance of each in the selection of both a tens figure and a units figure may be specified according to the following tabulation:

```
23  13  43  03  33
21  11  41  01  31
22  12  42  02  32
20  10  40  00  30
24  14  44  04  34
```

In the above tabulation "4" is the highest numeral shown. In order to effect the reception of numerals within the range "5" to "9" inclusive one or two marking impulses will be impressed upon segments 362 and 368 which are connected to relays 363 and 367 respectively, so that any one of the secondary selections made by a relay 361 is subject to a tertiary selection under the control of the two last mentioned relays. Each vertical row of relays 361 has a common significance for tens-digit selection. Their armatures are connected in parallel to one of the movable contacts of relay 363. Any one of the ten numerals may, therefore, be selected by the cooperation of relay 363 with one of the relays 361.

Relay 363 is provided with five front contacts so that when energized by a spacing unit on segment 362 current will be directed through cable 371, one of the magnets 364 each of which represents a tens-digit from "0" to "4" inclusive, and thence to ground. When a marking impulse is impressed upon segment 362, relay 363 will not be actuated, in which case the selection effected by one of the relays 361 will be directed through a back contact of relay 363, cable 365 and one of the magnets 366 (representative of numerals "5" to "9" inclusive) and thence to ground. The magnets 364 actuate stop pins 60 and 63 for controlling the setting of the tens-dials whenever a setting from "0" to "4" inclusive is to be made. Magnets 366 are correspondingly adapted to effect the setting of the tens-dials to any numeral from "5" to "9" inclusive.

Viewing the relays 361 in horizontal rows it will be seen that the front contacts of the respective relays of any such horizontal row are in parallel arrangement on a circuit leading to the movable contacts of relay 367 which relay is controlled by segment 368 of the second distributor. Since each relay 361 in any one horizontal row has the same significance as the others for units-digit selection, it will be seen that the arrangement of circuits controlled by relay 367 is analogous to that of the circuits controlled by relay 363 but in this case the units-digit magnets 369 (covering the range "0" to "4" inclusive) are selected when relay 367 is energized by a spacing unit on segment 368. Units-digit magnets 370 are selected when a marking impulse is impressed upon segment 368 so as to permit the movable contacts of relays 367 to remain against their back contacts. Magnets 369 and 370 are all connected to the conductor 322, whereby they derive current from battery F for energization when selected and it will be seen that the selection of any one of these magnets causes a circuit to be closed through the network of relays 367, 361, 363 and thence to the selected units-digit magnet 364 or 366, on the other side of the coils of which there is a ground connection.

In view of the fact that the selectivity of any one of the relays 361 is quadrupled by the cooperation therewith of relays 363 and 367 it will be seen that no only may any one of the numbers shown in the above tabulation be received and caused to control the setting of the tens and units dials of the quotation indicators but the co-ordinate arrangement of the relays 361 and their network provides the possibility of selecting any number according to the analogous arrangement of the three following tabulations:

Segments 362 and 368 receptive of marking and spacing units respectively:

```
73  63  93  53  83
71  61  91  51  81
72  62  92  52  82
70  60  90  50  80
74  64  94  54  84
```

Segments 362 and 368 receptive of spacing and marking units respectively:

```
28  18  48  08  38
26  16  46  06  36
27  17  47  07  37
25  15  45  05  35
29  19  49  09  39
```

Segments 362 and 368 both receptive of marking units:

```
78  68  98  58  88
76  66  96  56  86
77  67  97  57  87
75  65  95  55  85
79  69  99  59  89
```

The operation of the network K as shown in Fig. 13 will be understood to precede the selection of one of the magnets 351 for control of the fractions dials, provided the second distributor switch is brought into play. In other words, the reception of the signals for tens and units numerals calls for a delay in the reception of the signal for the fraction, and a corresponding delay in the actuation of the selective relays therefor and of the trip magnet 96 which controls the dial setting movement.

Referring again to Fig. 11, three segments 379 are shown connected respectively with relays 380. The network of secondary circuits controlled by relays 380 corresponds in its arrangement with the network of relays 337. Relays 380 are also provided with self-locking circuits, current for which is derived from the live conductor 322. This conductor also feeds current to the contact springs of the relays at the moment of energization of the relay 371, that is, when the brush 354 reaches segment 372. Relay 371 is also self-locking and when energized remains locked until after completion of the dial setting movement, that is, when the cam 311 has made a half revolution to open the circuit 322 at the contact springs 310.

According to the selection made by the permutative actuation of relays 380, one of the magnets 351 for setting the stop pins to control the setting movement of the fractions dials will result.

The selector circuits leading from the contact springs of the relays 380 to the magnets 351 are shown grouped in the cable 373. After a current has been directed through the left-hand coil of any of the relays 351 it continues through the left-hand coil of the trip magnet 96 and thence to ground. From this it will be seen that the selection of tens, units and fractions stop pins 60, 63 will have been made and the clutch of motor 410 will be tripped by the magnet 96 so as to actuate the setting mechanism. Upon breaking the locking circuits (at contacts 310) through the conductors 322, all relays will again be restored to normal.

The actuation of the setting mechanism which follows the reception of code signals will be readily understood in view of the foregoing description. The setting mechanism shown in Figs. 3, 4, 5, 6 and 12 includes certain relays and magnets which bear like reference numerals in the description and drawings of the receiving relay networks.

The sequence of operations of the setting mechanism when the unabridged signal is received is as follows:

1. Stock indicator group selector magnet 45$h$ is actuated when brush 307 contacts with segment 320 of the first distributor switch. The dials for the "last" quotation are lowered by the retainer 42 into the planes of rotation of pins 47 and 88.

2 (a) The functional indicator magnets 45$c$, 45$g$ and 45$h$ are actuated for the "opening" price when brush 307 contacts with segment 341 of the first distributor.

2 (b) Functional indicator magnet 45g is actuated for a new "high" quotation or magnet 45h for a new "low" quotation to set the corresponding dials simultaneously with the "last" quotation dials when the received signal so provides.

2 (c) Functional indicator magnet 45 together with either of the target setting magnets 75a or 75b are actuated for setting up the "previous close" quotation simultaneously with the "last" quotation when the received signal so provides.

2 (d) The "last" quotation dials may be selected for a setting movement unaccompanied by other functional indicator dials provided the functional indicator signal includes three spacing units on segments 334, in which case the circuit for energization of transfer relay 306 includes the resistance 344.

3. Relay 306 is actuated when brush 307 contacts with segment 341 of the first distributor.

4. Stop pins 60 are interjected into the path of lugs 59 of the racks 58, 61 whereby the angles of rotation of the shafts 48, 52 are determined.

5 (a) Stop pins 63 and 64 are withdrawn by pressure of pins 60 upon the actuating plates 406, 407.

5 (b) If the tens-dial is to be set to "0" then the operation of the magnet 364o withdraws its pin 63, leaving pin 64 in the path of the lugs 59 of the upper racks 58, 61.

5 (c) If the units-dial is to be set to "0", then the operation of magnet 369o withdraws its pin 63, leaving pin 64 in the path of the lugs 59 of the lower racks 58, 61.

6. Trip magnet 96 is actuated simultaneously with the magnets which control the stop pins.

7. Motor 410 drives shaft 55 through half a revolution during which all dial setting operations are completed.

8. Cam 311 and associated contacts 310 cause all relay locking circuits to be broken.

9. Rack bars 58, 61 are restored to starting positions during the second half revolutiton of shaft 55.

10. Motor 410 is disengaged by the trip device 95.

If the abridged quotation signal is received, trip magnet 96 is actuated when brush 307 contacts with segment 341 of the first distributor switch. The cases when this occurs include the setting of the fractions-dials while the setting movements for the tens- and units-dials are restrained from actuation. This is provided for by allowing all four of the stop pins 63, 64 to remain undisturbed in their positions of withholding the movement of the rack bars 58, 61 of the tens and units denominations. The reception of the "clear" signal will also enable the trip magnet 96 to be energized when the brush 307 contacts with the segment 341. In this case (as has been shown) the stop pins 64 are withdrawn by pressure of pin 60a upon the yoke piece 36. The movement of the rack bars 58, 61 for tens-, units- and fractions denominations is, therefore, suitably controlled by the interposition of pins 60a and 63 whereby all but the "previous close" indicators of any stock group are given the "clear" setting.

It will be observed that the cam 311 is mounted on the shaft 55 in such position that all of the relay locking circuits will be broken at the moment of completion of the setting strokes of the rack bars 58, 61. The return movement of these rack bars takes place, therefore, after the drums 39 have been locked in the position of their new setting by the release of the magnets 45 and the consequent up-raising of the retainer members 42. This arrangement obviates the possibility of the drums being moved out of position through friction of their hubs against the rotating surfaces of the shafts 48.

In order to provide freedom of choice of stocks to be quoted at each receiving station, the switch-panel 374 may be used as shown in Fig. 12. The conductors 332 may each terminate in a jack 375 appropriate to a predetermined stock selection. As many plugs 376 are provided as there are stock indicator groups on the quotation board. The plugs 376 are shown connected to different relays 45h by individual cord conductors, such as 332'. Hence the switch-panel 374 with its jacks 375 and cooperating cord and plug connections to the indicator selecting magnets 45h enables a subscriber to make his individual selection of stocks to be quoted, up to the capacity of the quotation board provided for his service. The master quotation board, however, is required to be of such capacity as to comprehend all of the stocks for which quotations will be transmitted from the sending station.

In order to provide for the proper control of the high and low indicators representing stocks which fluctuate above and below 100 in any one day, the stocks subject to these fluctuations may be represented at the master quotation board by groups of rotary switches including specially wired rotary switches 144, 147. The tens-keys 1 may bear in addition to their usual designations small red numerals indicative of their use when quoting these particular stocks. For example, a small red "0" may appear upon the "5"-key. A small red "9" may appear on the "4"-key. The keyboard operator would readily memorize the list of stocks for which he would be guided by the red numerals. In this manner the test circuits as shown in Fig. 7 may be enabled to function suitably when the wiper 164 of the "high" price indicator and the corresponding tens-digit wiper of the "low" price indicator are swung to either side of the "0"-setting. A compensating shift in the position of the designating numerals on the tens-drums 39 in angular relation to the web members 53 may be made so as to correctly indicate quotations of these stocks. An alternative arrangement may be adopted in which no modification of the drums is necessary but a special row of tens-keys on the keyboard 4 is provided. These special keys, preferably bearing numerals of a distinguishing color may be connected to the code composing relays 247 in an arrangement which duplicates that of the regular tens-keys but the special keys would be connected in transposed arrangement as regards their contact springs 106 leading to the segments of rotary switches 144 and 147. The wipers will then swing to either side of the "0"-segments.

*Recapitulation*

Reference is made to Fig. 1 for a recapitulation of the features of my invention. The transmitting keyboard 4 is shown with its letter-keys 200 in the three upper rows for setting up abbreviations of stocks to be quoted. The signal lamp 284 gives warning of any set-up which does not need to be transmitted and also flashes upon completion of the transmission of any signal. The tens-keys 1, units-keys 2 and fractions-keys 3 are shown in separate rows. Keys 182 and 183 are provided for setting up the previous closing prices. The clearance key 184 serves to clear the registers at the end of the day, or may be used at any time as a correction key. The starting key 38 appears like the space bar of a typewriter.

Networks for the composition of the signals to be transmitted are shown generally in three groups, namely the abbreviation code-composing network L, the functional code-composing network M and the tens, units and fractions code-composing network N. These networks are shown suitably connected to the first and second line distributor segments. The communications channel or "line" leads outwardly from the transmitter, passing through one of the line relays 301 and thence through similar line relays located (but not shown) in each of a plurality of geographically spaced quotation boards 300.

The broken line $t-t$ separates the transmitter proper from the master quotation board on its right. The broken line $u-u$ separates the master quotation board from the various secondary quotation boards. In the master quotation board the stock indicator selector magnets 239 are operated in advance of such selector magnets in the secondary quotation boards in order that the test circuits may be enabled to function before transmission of the signals. The receiving line distributor switches, however, are operative in both the master and the secondary quotation boards simultaneously and any changes which may be effected in the setting of the rotary switches of the master quotation board will be simultaneous with the setting of the dials in the secondary quotation boards. Furthermore, the control of the functional indicator selector magnets 45 will be simultaneously effected in the master quotation board and in the secondary quotation boards.

It will thus be seen that I have provided a system of signaling code transmission which is capable of remotely controlling a plurality of stock quotation boards for progressive registration of haphazardly occurring quotations.

In accordance with the methods employed in the carrying out of my system, signals are modified upon the making of automatic comparisons as between quotations set up on the keyboard and previously registered quotations. My system provides a plurality of groups of registering means, each group representing a different stock and being subject to the control of the selective mechanism common to all. The signaling system is such that a functional indicator significance may be combined with the numerical purport of the signals and by this combination extreme-quotation indicators may be set simultaneously with the market quotation indicators. The functional indicator selectors cause the extreme-quotation indicators to distinguish between quotations which are new extremes from quotations which are not new extremes.

In the system of my invention progressive selection of instrumentalities is provided. For example, in selecting a quotation indicator group the first stage of selection is to actuate relays in accordance with the marking and spacing units of the signals. The second stage of the selection may be to designate a relay appropriate to the first letter of an abbreviation. The third stage of selection may be to select another relay appropriate to the second letter of an abbreviation. Further stages of selectivity are provided in a similar manner for the energization of relays which effect functional indicator selection. Finally the transmission and reception of code signals for the control of setting mechanism and for starting the setting mechanism in operation to mechanically adjust the dials has been shown to be a matter of progressive selection.

It will be understood that the various secondary quotation boards may each be provided with a more or less abbreviated group of stock indicators as compared with the full quota of such indicators to be comprehended in the master quotation board. Thus any subscriber to quotation board service may be served only with the quotations of such stocks as may meet his requirements. His selection of stocks to be quoted may therefore be entirely different from the selections of other subscribers. Furthermore, as shown in Fig. 12, he may "plug-in" on a jack board of usual type and connect his stock indicator group selector circuits so as to have the quotations of the various stocks displayed in any desired tabular arrangement. The subscriber may even shift the connection of a stock indicator group so as to be receptive of quotations of a different stock; altho it would be preferable to do this before the opening hour of the market in order not to lose the benefit of the opening price and of the progressively widening range of the extreme quotations.

In transmitting and receiving a haphazard succession of signals for quotations of a variety of stocks, the market quotation indicators will at all times be selected and controlled, while the "high" and "low" indicators will be selected and controlled only when previous limits are exceeded. A multiple registration of signal effects will therefore be understood to consist in simultaneously registering a quotation both upon the market indicator and upon one of the extreme quotation indicators.

In accordance with the operation of the test circuits of the master quotation board it will be seen that signals may be transmitted for the full quotation whenever a change occurs that is other than merely fractional but that an abridged train of signals may be transmitted representing the abbreviation and the fraction only in case the fluctuation of price of the particular stock being quoted is merely fractional.

I have also shown how even a contracted signal train may be modified so as to control either a "high" or "low" indicator simultaneously with the market indicator. I have shown how in special cases functional indicators may be set to display the previous closing price having one or another hundreds numeral.

I have shown how the opening price may be set up simultaneously on indicators for the "opening," "high," "low" and "last" quotations. Finally I have shown how all but the "previous close" indicators may be "cleared."

To those skilled in the art, various modifications of my invention will be suggested by the foregoing description. I do not, therefore, limit myself to the particular embodiment of my system herein shown. The scope of the invention is limited only as defined by the appended claims.

I claim:

1. In a quotation transmitting and tabularly registering receiving system, changeable quotation registers, means to set up a new quotation, means to automatically compare said set up with corresponding registrations of previous quotations, means to transmit signals, means to characterize a signal to be transmitted for remotely and tabularly registering a new quotation, means controlled by said comparison means to expand said signal to represent a quotation totally different from its corresponding predecessor quotation, to contract said signal to represent a quotation partially different from its corresponding predecessor quotation and to suppress the transmission of said signal when no difference exists between said new quotation and its corresponding predecessor quotation.

2. A quotation signal transmitter, a plurality of signal receiving stations including a master receiving station, comparison means connected between said signal transmitter and said master receiving station and operable to compare the set up of a quotation about to be sent with a previously registered quotation to determine instances of new extreme quotations, a communications channel by which said transmitter and all of said receiving stations are interconnected, and means operable at said transmitter under the control of said comparison means to automatically effect a modification of the significance of certain of said signals when such signals represent new extreme quotations.

3. In a system for remote control of tabularly registering quotation boards, a pair of code-transmitting distributors, a keyboard for partially controlling the composition of the register setting signals to be transmitted, price comparison means contributing to the control of the composition of said register-setting signals and means operable under control of said price comparison means whereby said signals are rendered transmittable at times in contracted form from one only of said distributors and at times in expanded form from the two distributors operated in succession.

4. A system in accordance with claim 3 in which a pair of code-receptive distributors is provided at each of a plurality of quotation board stations and means is provided whereby said code-receptive distributors of each pair are operable singly and dually in accordance with the operation of said code-transmitting distributors.

5. In a system of the class described, a plurality of tabularly registering quotation boards, means including a leader distributor and a follow-up distributor for transmitting a succession of signaling impulses suitable for controlling the set-up of registrations on said quotation boards, and means the actuation of which is determined by the character of the signal succession for actuating both the leader and the follow-up distributors when transmission of expanded signals is required and for actuating the leader distributor alone when transmission of contracted signals for effecting a proper set-up of registrations is possible.

6. A system in accordance with claim 5 in which the quotation boards include registers for tens and units figures and fractions and the signals for tens, units and fractions are transmittable over the follow-up distributor, the signals for the fractions being also transmittable over the leader distributor when the signals for tens and units figures are to be suppressed.

7. In a stock quotation system, a master receiving board provided with a registering mechanism for each stock, each mechanism having low and last shelves comprising a plurality of registers and means settable by the registers on the low shelf in accordance with a low price, a transmitter comprising a keyboard and means selectively controlled by said keyboard for storing and transmitting impulses in accordance with a predetermined quotation, means at said board responsive to the transmitted impulses for setting the registers on the last shelf of a particular registering mechanism to display said quotation, price comparison means operative prior to the transmission of a signal representing the settings of the transmitter key board for comparing said settings with existing registrations stored by the registers on the low shelf of said board, selective means at the transmitter operable under control of said price comparison means to determine whether said predetermined quotation is a new low, and additional selective means at said board operable by said transmitter under control of the first said selective means when said predetermined quotation is a new low to prepare the registers on the low shelf of the particular mechanism to post said predetermined quotation.

8. In a numerical comparator, a plurality of storage devices operable in accordance with predetermined numerical values of an item, means for selectively operating said devices to store predetermined numerical values of said item, other means operable in accordance with a number to be compared with said numerical values, signal means, a source of potential for operating said signal means, and means including a series circuit from said source of potential completed jointly by each of said storage devices and said other means, for operating said signal means when one of a plurality of predetermined relations exists between said number and said predetermined values of the item.

9. In a numerical comparator, a plurality of storage devices having selectively operable contact elements, means for operating selected contact elements of the storage devices for setting up predetermined numbers in each of said storage devices, a signal device, a keyboard mechanism upon which numbers may be set up and a single series circuit including said keyboard mechanism, operated contact elements of said storage devices and said signal device for determining whether the number on the keyboard is higher than that set up in one of said storage devices.

10. In a numerical comparator, a plurality of contact means, one individual to each of a plurality of items, each of said contact means being closable selectively in accordance with a predetermined value of the item represented thereby, a device common to said contact means arranged to be operated in accordance with predetermined numbers, means also included in said device for selecting one of said contact means, said last means permitting said selection to be maintained throughout a plurality of successive operations of said devices, indicator means and means controlled jointly by said device and said selected contact means upon each operation of said device for operating said indicator means to indicate a certain numerical relation of each of the numbers successively represented by said device and said selected contact means, respectively.

11. In a stock quotation system, a master receiving board provided with a registering mechanism for each stock, each mechanism having a last-price shelf comprising a plurality of digital registers and means settable by the registers on the last-price shelf in accordance with a "last" price, a transmitter comprising a keyboard and means selectively controlled by said keyboard for storing and transmitting impulses in accordance with a predetermined new quotation, means at said board responsive to the transmitted impulses for setting the registers on the last-shelf of a particular registering mechanism to display said new quotation, price comparison means operative prior to the transmission of a signal representing the settings of the transmitter keyboard for comparing the same settings with existing registrations stored by the registers on the last-price shelf, said impulse transmitting means being operable under control of said comparison means and in such manner as to economize signalling time by deletion of signals representing digits of the new quotation which are the same as corresponding digits of the existing registration.

12. In a quotation system, the combination of a transmitter, a receiver, electrical circuit connections over which selecting and operating impulses of price significance are transmitted between the transmitter and the receiver, a plurality of groups of indicators in the receiver, means at the transmitter responsive to selecting impulses transmitted over certain of said connections for predetermining the purport of operating impulses of price significance to be subsequently transmitted, and switches in the receiver each operable by said means to connect different combinations of indicators to said circuit connections whereby indicators of several groups may be variably operated concurrently in response to said operating impulses.

13. In a numerical comparator, selectable storage devices for a plurality of items, each of said storage devices having a plurality of switches settable in positions corresponding to different item values, manipulative means for setting up a new item, selective means for connecting said manipulative means with a predetermined storage device, a signal device, and relay means connected in a single series circuit through said manipulative means and selected ones of said switches for causing said signal device to respond when a predetermined numerical relation exists between the value of the item represented by the selected storage device and the new item set up by said manipulative means.

14. The combination of a central station and a second station comprising a plurality of groups of indicators; signalling channels interconnecting said stations, manipulative means at said central station for setting up a quotation about to be posted on at least one of said groups of indicators, means at said second station effective through certain of said channels for communicating a posting requirement respecting the groups of indicators to be controlled by said manipulative means, and selective means at said second station responsive to impulses initiated at said central station in accordance with said posting requirement for rendering one or more groups of indicators controllable, and means operative thereafter for transmitting through said channels a succession of indicator posting impulses which give effect both to said posting requirement and to the actuation of said manipulative means.

15. An electrical indicating device comprising a plurality of groups of indicators at a receiving station, each group including a plurality of sets of indicators, means for selecting a particular set or sets of indicators of a particular group and means for operating said selected indicators, said last mentioned means comprising two rotary signal regenerating distributors, control channels for transmitting indicator-operating signals to said distributors, and means responsive only to a specially characterized signal received on the segments of one distributor for releasing the second distributor and for causing the same to regenerate certain of the transmitted signals.

16. In a transmitting and receiving system a plurality of stock indicator groups, means for transmitting signal trains each representing a given quotation, means responsive to an initial portion of each signal train for selecting a stock indicator group to be actuated, comparison means effective prior to the transmission of subsequent portions of the signal train for determining whether and in what manner a quotation about to be transmitted differs from a previously transmitted quotation assignable to the same indicator group, means for composing an intermediate portion of each signal train in accordance with the operation of said comparison means, indicator shelf selecting means responsive to said intermediate portion of the signal train, and indicator setting means effective upon the selected indicator shelf or shelves to display the quotation whose value is represented by a final portion of the signal train.

17. The invention according to claim 16 and including means operable under control of said comparison means for suppressing the transmission of any signal train for a new quotation that is unchanged with respect to said previously transmitted quotation.

18. A quotation system comprising a signal train transmitter, said signal train being normally inclusive of code signals representing the numerals and fraction of a new price, code-composing means in which said new price is stored prior to the transmission of said signal train, registering means for storing an old price, a comparator connectible between the respective means for storing new and old prices, means operative in response to the functioning of said comparator for causing said transmitter to contract the signal train by deletion of signals representing like numerals in corresponding denominations of the old and new prices and means to transmit a signal representing the new fraction.

19. A quotation system according to claim 18 and including "high" and "low" registers in the means for storing an old price, and means operative in response to the functioning of said comparator for causing said transmitter to transmit a signal train which, irrespective of its length, is suitably characterized for causing a new high price to be stored in the "high" register and a new low price to be stored in the "low" register.

20. In a quotation system, a plurality of separately located receiving stations including a master receiving station, a transmitting station adjacent the master receiving station, means for storing a new price at the transmitting station, means for simultaneously registering successive prices at each of said receiving stations, a comparator connectable between the new price storing means and selected ones of said registers at said master receiving station, and signaling means under joint control of said new price storage means and said comparator for causing progressively new high and low prices to be registered as such in appropriate registers at said receiving stations, said signaling means being operable to transmit a signal for a new price subsequent to the comparison of that price with certain prices previously registered at said master receiving station.

21. In a quotation system, a transmitter adapted to transmit register selective signals and price signals, and having means for storing a new price, a receiver having a plurality of registers including an opening price register within a group, said registers being settable to display a blank or a price, a comparator connectable between said storage means and one of said registers when it is set to display a blank, means responsive to the functioning of said comparator for causing said transmitter to transmit a selective signal whereby said opening price register is controlled, and means operative in response to the subsequent transmission of a signal representing the stored new price for correspondingly setting said opening price register simultaneously with other registers of its group.

22. In a quotation system, a transmitter having code composing means and a pair of start-stop code sending distributors, a receiving station having price registers operable in response to signals, a comparator having circuits connectable between said code composing means and selected ones of said registers, and means operable in dependence upon the functioning of said comparator for at times causing one only of said distributors to make a start-stop excursion, and at other times for causing excursions to be made by the two distributors successively, thereby to transmit the essential signals for operating selected registers at said receiving station.

23. The invention as defined by claim 22 in combination with means for producing such cooperation between the code composing means and the comparator that both distributors are restrained from making any excursion whenever a repetitive price is set up on said code composing means.

24. The invention as defined by claim 22 in combination with a pair of receiving distributors at said receiving station and means for causing one or both of said receiving distributors to make excursions in conformity with the excursions of the corresponding sending distributors.

25. In a quotation system, a master receiving station comprising rotary switches adapted to be set by and to store the effects of received code signals which are formulated in accordance with a succession of new prices, a transmitter having temporary storage means for said new prices and means controllable in accordance therewith for sending said code signals, secondary receiving stations comprising selectable groups of quotation registers, each group including an "opening" price register and other registers on which the effects of received code signals may be displayed, means comprising a circuit through a given segment on one of said rotary switches and operable when said switch is set to an initial position for causing an "opening" register-selective signal to be formulated, and means operative subsequent to the transmission of said selective signal for transmitting a signal corresponding to the price temporarily stored at the transmitter, thereby to simultaneously actuate those of said rotary switches and those of said quotation registers which are selected to be set to said new price.

26. The invention as defined by claim 25 and including means for transmitting a "clearing" signal, and means responsive thereto for restoring the opening price registers to a blank position and for simultaneously restoring corresponding rotary switches at the master receiving station to said initial position.

27. The invention as defined by claim 25 and including a "previous closing" price register in each group, means responsive to a signal train including a "previous closing" register-selective signal and a price signal for setting up a new price on said "previous closing" price register, means for transmitting a "clearing" signal, and means responsive thereto for simultaneously restoring to a blank position all of the registers of a given group except said "previous closing" price register.

28. In a quotation receiver having register dials disposed in parallel rows, parallel actuating shafts arranged in pairs, a separate pair for each row, means for imparting simultaneous movements of complementary extent to said shafts, said means being variably operative in accordance with the reception of signals of numerical significance, means for selecting denominationally integrated dials for simultaneous actuation to display the quotation represented by a train of said signals, and means controlled by said selective means for causing each dial to be directly driven by one of said shafts from a previous setting to a new setting and to be arrested by the shaft whose movement is complementary to the driving shaft.

29. In a quotation system, a transmitter adapted to transmit successively a stock group selecting signal, a shelf selecting signal, and a price signal, means at the transmitter for storing a new price, a receiving station having groups of registers, each register being identifiable by shelf and being adapted to store an old price, a comparator for establishing communication between the storage means at the transmitter and registers of a selected stock group at the receiver, and means responsive to the action of the comparator for transmitting a suitable shelf selecting signal whereby the subsequently transmitted signal for the new price is registered on a predetermined shelf or shelves in the selected stock group.

30. The combination according to claim 29 and including means for abridging the price signal when the functioning of the comparator shows that certain digits of the new and old prices are in agreement.

31. The combination according to claim 29 and including means for suppressing the transmission of the price signal when the functioning of the comparator shows that the new and old prices are the same.

32. In a quotation system, a plurality of register dials operable as a denominationally integrated unit, means responsive to a single seven unit code signal for determining the setting movements by which two of said dials are to be simultaneously, but independently positioned, and transmitting means for so characterizing said code signal that said two dials may be set to display any integral number less than 100.

33. In an intelligence disseminating system, means to transmit code signals, a master receiving station and a plurality of secondary receiving stations, each of said stations having groups of separate devices, means at each station to effect a like response to a given signal, said response constituting the simultaneous selective actuation of corresponding devices at each station, means whereby one of said signals is automatically characterized in accordance with the relation between the value of certain previously transmitted signals as registered at said master station and the value of a train of signals about to be transmitted, and means at each station to render additional ones of said devices simultaneously responsive to certain of said code signals following said automatically characterized signal whenever progressively widening limits of variation in the values of said code signals are exceeded.

34. In a quotation system, a receiving station comprising a plurality of stock indicator groups, each group having a plurality of registers for different functions and each register having digital and fractional indicator members, a transmitting station having means settable in preparation for the transmission of code signals of uniform length, said signals having an indicator group selective significance, means to transmit said code signals, means to transmit signals of variable length the significance of which is to control the selection of registers having different functions, means to transmit other signals of variable length having register-setting significance, and means controlled by the status of said registers at the time of setting of said signal preparatory means to expand the first said variable length signals in response to which the digital and fractional indicators for one or more functions in a stock group are selected, and to expand the second said variable length signals in response to which the digital and fractional members so selected are caused to be completely re-set, the last said means being at times operable to contract said variable length signals in response to which only the fractional members are caused to be re-set.

35. In a quotation system, a receiving station comprising a plurality of stock indicator groups, each group having a plurality of registers for different functions and each register having digital and fractional indicator members, a transmitting station having means settable in preparation for the transmission of code signals of uniform length, said signals having an indicator group selective significance, means to transmit said code signals, means to transmit signals of variable length the significance of which is to control the selection of registers having different functions, means to transmit other signals of variable length having register-setting significance, and means controlled by the status of said registers at the time of setting of said signal preparatory means for characterizing said variable length signals, whereby they are adapted to render a given one register or a given plurality of grouped registers responsive to a setting movement, according to their functional requirements for displaying "opening," "high," "low," and "last" prices.

36. A quotation transmitting and indicating system including a numerical comparator, said system comprising a receiving device settable to different positions respectively corresponding to successive changes in the instant price of a stock or other commodity which fluctuates in value, means operatively connected with said receiving device for setting said device from a remote point, in accordance with changes in the prices of the stock or other commodity, to different ones of said positions respectively corresponding to the new prices of the stock or other commodity, a transmitter at said remote point comprising means operable to store a new price of said stock or other commodity, means to send out a signal representative of said new price, starting means to initiate the operation of said sending means, and means operative by said comparator when said instant price set up on said receiving device equals the new price stored at the transmitter for disabling said starting means.

37. A quotation system for stocks or other items which fluctuate in price, comprising a plurality of groups of indicators settable in accordance with the fluctuating prices of the items, each of said groups having instant price and price range indicators individual to one of said items, means common to said groups and responsive to electrical signals for selecting the group corresponding to a desired item, means responsive to price signals for setting the indicators of the selected group to a position representative of the instant price of the item, other means settable in accordance with successive new prices of the items, means operable under control of the selected group of devices for automatically comparing the previously posted instant and range prices of the selected item with a new price of the item set up on said other settable means, and means operative in accordance with the result of such comparison for causing said price signals to be subsequently transmitted whenever at least one of said indicators is required to be reset, and for causing said price signals to be suppressed in the event that the new price is unchanged.

38. A system in accordance with claim 37 and including an indicator adjacent said new price settable means, and means for actuating the last said indicator whenever the transmission of price signals is to be suppressed.

RALPH W. BUMSTEAD.